US012786471B2

(12) United States Patent
Zhang

(10) Patent No.: US 12,786,471 B2
(45) Date of Patent: Nov. 3, 2026

(54) MULTIMEDIA CODING METHOD AND APPARATUS, DEVICE, MEDIUM, AND PRODUCT

(71) Applicant: Tencent Technology (Shenzhen) Company Limited, Shenzhen (CN)

(72) Inventor: Jia Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 23 days.

(21) Appl. No.: 19/096,581

(22) Filed: Mar. 31, 2025

(65) Prior Publication Data

US 2025/0234041 A1 Jul. 17, 2025

Related U.S. Application Data

(63) Continuation of application No. PCT/CN2024/090763, filed on Apr. 30, 2024.

(30) Foreign Application Priority Data

May 4, 2023 (CN) ......................... 202310503280.7

(51) Int. Cl.
*H04N 19/103* (2014.01)
*H04N 19/124* (2014.01)
(Continued)

(52) U.S. Cl.
CPC ........... *H04N 19/60* (2014.11); *H04N 19/124* (2014.11); *H04N 19/132* (2014.11); *H04N 19/176* (2014.11); *H04N 19/46* (2014.11)

(58) Field of Classification Search
CPC .... H04N 19/60; H04N 19/124; H04N 19/132; H04N 19/176; H04N 19/46
See application file for complete search history.

(56) References Cited

U.S. PATENT DOCUMENTS

2015/0350686 A1 12/2015 Zhou et al.
2019/0116380 A1* 4/2019 Chuang .................. H04N 19/93
(Continued)

FOREIGN PATENT DOCUMENTS

CN 101287123 A 10/2008
CN 111355955 A 6/2020
(Continued)

OTHER PUBLICATIONS

Tencent Technology, ISR, PCT/CN2024/090763, Jun. 14, 2024, 2 pgs.

*Primary Examiner* — Howard D Brown, Jr.
(74) *Attorney, Agent, or Firm* — Morgan, Lewis & Bockius LLP

(57) ABSTRACT

This application provides a multimedia coding method performed by an electronic device. The method includes: recording transform mode information of each residual block in a first coding stage of a multi-stage coding for multimedia, the transform mode information representing whether a transform skip mode is applied to the residual block; obtaining, in a non-first coding stage, the transform mode information of each residual block recorded in the first coding stage; determining transform mode information of a current residual block according to the transform mode information recorded in the first coding stage; and coding the current residual block according to the transform mode information of the current residual block.

20 Claims, 12 Drawing Sheets

(51) Int. Cl.

| | |
|---|---|
| ***H04N 19/132*** | (2014.01) |
| ***H04N 19/176*** | (2014.01) |
| ***H04N 19/46*** | (2014.01) |
| ***H04N 19/60*** | (2014.01) |

(56) References Cited

U.S. PATENT DOCUMENTS

| | | | | |
|---|---|---|---|---|
| 2021/0084341 | A1* | 3/2021 | Ray ...................... | H04N 19/186 |
| 2022/0201278 | A1* | 6/2022 | Zhao .................... | G09G 3/2074 |
| 2022/0286700 | A1* | 9/2022 | Zhao .................... | H04N 19/103 |

FOREIGN PATENT DOCUMENTS

| | | | |
|---|---|---|---|
| CN | 111988617 | A | 11/2020 |
| WO | WO 2018096067 | A1 | 5/2018 |

* cited by examiner

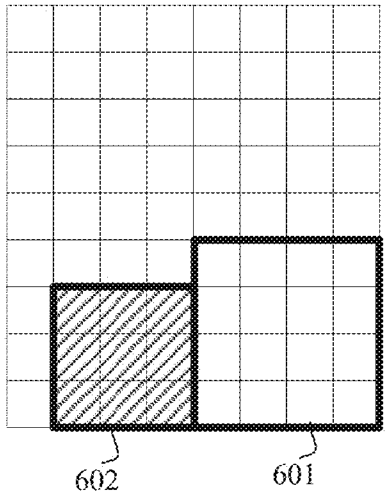

FIG. 6

S410: Determine a size of each residual block and transform mode information of each residual block in a first coding stage of a multi-stage coding for multimedia S420: Store the transform mode information of each residual block into a corresponding flag bit according to the size of each residual block S430: Obtain, in a non-first coding stage, the transform mode information of each residual block recorded in the first coding stage from the flag bit S710: Obtain a reference flag bit corresponding to each sub-block in the current residual block according to the transform mode information of each residual block recorded in the first coding stage and the size and a position of the current residual block, each sub-block having the minimum size of the residual block, and the reference flag bit corresponding to each sub-block in the current residual block being the flag bit of the sub-block at a same position in the first coding stage S720: Determine distribution of the sub-blocks to which a transform skip mode is applied among various sub-blocks at the same position as the sub-blocks in the current residual block in the first coding stage according to the reference flag bit corresponding to each sub-block in the current residual block S730: Determine the transform mode information of the current residual block according to the obtained distribution of the sub-blocks to which the transform skip mode is applied S240: Code the current residual block according to the transform mode information of the current residual block

FIG. 7

MULTIMEDIA CODING METHOD AND APPARATUS, DEVICE, MEDIUM, AND PRODUCT

CROSS-REFERENCE TO RELATED APPLICATIONS

This application is a continuation application of PCT Patent Application No. PCT/CN2024/090763, entitled "MULTIMEDIA CODING METHOD AND APPARATUS, DEVICE, MEDIUM, AND PRODUCT" filed on Apr. 30, 2024, which claims priority to Chinese Patent Application No. 2023105032807, entitled "MULTIMEDIA CODING METHOD AND APPARATUS, DEVICE, MEDIUM, AND PRODUCT" filed with the China National Intellectual Property Administration on May 4, 2023, both of which are incorporated herein by reference in their entirety.

FIELD OF THE TECHNOLOGY

This application relates to the field of multimedia coding technologies, and in particular, to a multimedia coding method, a multimedia coding apparatus, an electronic device, a computer-readable storage medium, and a computer program product.

BACKGROUND OF THE DISCLOSURE

Currently, there are a plurality of encoders using standardized video coding technologies, and most common encoders need to sequentially perform main operations such as prediction, transform, quantization, and entropy coding, to obtain a compressed binary code stream. However, in some scenarios, for a transform unit satisfying a size limitation, the transform operation is alternative.

In a related technology, the encoder determines whether transform is skipped in a manner of simultaneously coding according to a transform mode and coding according to a transform skip mode, and then selects a most appropriate mode according to a coding result. However, by performing coding in two modes simultaneously, computing complexity of the encoder is increased, and consequently, more computing resources and a longer coding time are required for coding.

SUMMARY

To resolve the foregoing technical problem, embodiments of this application provide a multimedia coding method, a multimedia coding apparatus, an electronic device, a computer-readable storage medium, and a computer program product, to effectively reduce computing complexity in selection of transform mode information during a multi-stage coding, thereby reducing code stream coding time and overheads of computing resources, and helping improve coding efficiency.

According to one aspect of the embodiments of this application, a multimedia coding method is provided, the method including: recording transform mode information of one or more residual blocks in a first coding stage of a multi-stage coding for multimedia, the transform mode information representing whether a transform skip mode is applied to the one or more residual blocks; obtaining, in a non-first coding stage, the transform mode information of the one or more residual blocks recorded in the first coding stage; determining transform mode information of a current residual block according to the transform mode information recorded in the first coding stage; and coding the current residual block according to the transform mode information of the current residual block.

According to one aspect of the embodiments of this application, a multimedia coding apparatus is provided, including: a recording module, configured to record transform mode information of one or more residual blocks in a first coding stage of a multi-stage coding for multimedia, the transform mode information representing whether a transform skip mode is applied to the one or more residual blocks; an obtaining module, configured to obtain, in a non-first coding stage, the transform mode information of the one or more residual blocks recorded in the first coding stage; a determining module, configured to determine transform mode information of a current residual block according to the transform mode information recorded in the first coding stage; and a coding module, configured to code the current residual block according to the transform mode information of the current residual block.

According to one aspect of the embodiments of this application, an electronic device is provided, including one or more processors; and a storage apparatus, configured to store one or more computer programs, the one or more computer programs, when executed by the one or more processors, causing the electronic device to implement the multimedia coding method as described above.

According to one aspect of the embodiments of this application, a non-transitory computer-readable storage medium is provided, having a computer program stored herein, the computer program, when executed by a processor of an electronic device, causing the electronic device to implement the multimedia coding method as described above.

According to one aspect of the embodiments of this application, a computer program product is provided, including a computer program, the computer program being stored in a computer-readable storage medium, a processor of an electronic device reading the computer program from the computer-readable storage medium and executing the computer program, to cause the computer device to implement the multimedia coding method as described above.

BRIEF DESCRIPTION OF THE DRAWINGS

Accompanying drawings herein are incorporated into the specification and constitute a part of this specification, show embodiments that conform to this application, and are configured for describing a principle of this application together with this specification. Apparently, the accompanying drawings described below are merely some embodiments of this application, and a person of ordinary skill in the art may further obtain other accompanying drawings according to the accompanying drawings without creative efforts. In the accompanying drawings:

FIG. 6 is a schematic diagram of transform mode distribution of sub-blocks of a residual block according to an exemplary embodiment of this application.

FIG. 7 is a flowchart of another multimedia coding method according to an exemplary embodiment of this application.

DESCRIPTION OF EMBODIMENTS

Figure 1:
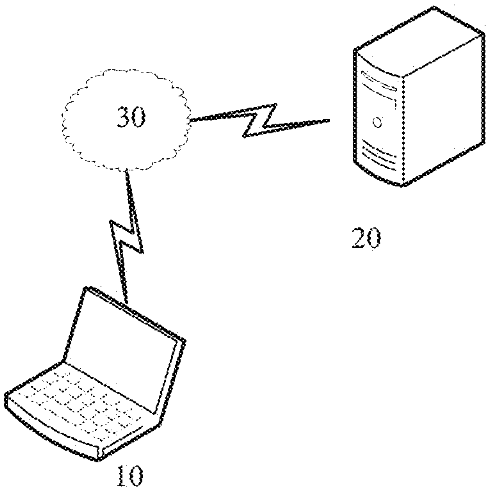
FIG. 1 is a schematic diagram of an implementation environment involved in this application.

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with the present application. On the contrary, the implementations are only examples of apparatuses and methods consistent with some aspects of this application as claimed in claims.

The block diagrams shown in the accompanying drawings are merely functional entities and do not necessarily correspond to physically independent entities. To be specific, the functional entities may be implemented in a software form, or in one or more hardware modules or integrated circuits, or in different networks and/or processor apparatuses and/or micro-controller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

In addition, "plurality of" mentioned in this application means two or more. The term "and/or" is configured for describing an association relationship between associated objects and representing that three relationships may exist. For example, A and/or B may represent the following three cases: only A exists, both A and B exist, and only B exists. The character "/" generally indicates an "or" relationship between the associated objects.

The technical solutions in the embodiments of this application relate to the field of cloud technologies. Before the technical solutions in the embodiments of this application are described, the cloud technologies are first briefly described.

Cloud technology is a collective name of a network technology, an information technology, an integration technology, a platform management technology, an application technology, and the like based on an application of a cloud computing business mode, and may form a resource pool, which is used as required, and is flexible and convenient. The cloud computing technology may become an important support. Back-end services of a technology network system require a huge amount of computing and storage resources, such as video websites, picture websites, and more portal websites. With advanced development and application of the Internet industry, every item may have its own identification mark in the future, which needs to be transmitted to a back-end system for logical processing. Data at different levels may be processed separately, and various types of industry data require strong system back support, which can only be implemented through cloud computing.

Cloud computing is a computing mode, in which computing tasks are distributed on a resource pool formed by a large quantity of computers, so that various application systems can obtain computing power, storage space, and information services according to requirements. A network that provides resources is referred to as a "cloud". For a user, resources in a "cloud" seem to be infinitely expandable, and can be obtained readily, used on demand, expanded readily, and paid per use.

As a basic capability provider of cloud computing, a cloud computing resource pool (cloud platform for short, and generally referred to as an Infrastructure as a Service (IaaS) platform) is established, and multiple types of virtual resources are deployed in the resource pool, to be selected by an external customer for use. The cloud computing resource pool mainly includes: a computing device (being a virtualization machine, and including an operating system), a storage device, and a network device.

The technical solutions of the embodiments of this application are described in detail below in combination with the cloud technology and the implementation environment:

FIG. 1 is a schematic diagram of an implementation environment involved in this application. A content producer 10 and a server 20 are included. In an example, the server 20 may be a computing device in the foregoing cloud computing resource pool, and has a large amount of computing and storage resources, and the server is provided with an encoder, where the content producer 10 may be a video website, a picture website, or the like.

The content producer 10 is configured to generate multimedia and transmit a request to the server 20. The request carries the multimedia. In an example, the content producer 10 further needs to pay for requesting the server 20 to code the multimedia for a plurality times by using its own resource.

The server 20 is configured to code the multimedia for a plurality of times, where during first coding, operations such as prediction, transform, quantization, and entropy coding are performed, and then transform mode information of a residual block obtained after the prediction is recorded. Specifically, the transform mode information of the residual block is recorded in a first coding stage of a multi-stage coding for multimedia, and in a non-first coding stage, the transform mode information of each residual block recorded in the first coding stage is obtained; the transform mode information of a current residual block is determined according to the transform mode information recorded in the first coding stage and attribute information of the current residual block; and the current residual block is coded according to the transform mode information of the current residual block.

In other embodiments, alternatively, the content producer 10 may independently execute the multimedia coding method. For example, the content producer is provided with an encoder. After multimedia is generated by a media generator, the multimedia is coded by the encoder for a plurality of times. In the first coding stage of the multi-stage coding for multimedia, the encoder of the content producer records the transform mode information of the residual block, obtains, in a non-first coding stage, the transform mode information of each residual block recorded in the first coding stage, then determines the transform mode information of the current residual block according to the attribute information of the current residual block, and codes the current residual block.

In other embodiments, the server 20 may alternatively select the multimedia, for example, fetch the multimedia from a network, and further code the multimedia for a plurality of times.

In an example, the content producer 10 may be any electronic device capable of obtaining a target video and a to-be-processed image such as a smart-phone, a tablet computer, a notebook computer, a smart speech interaction device, a smart household appliance, an in-vehicle terminal, or an aircraft. The server 20 may be an independent physical server, or may be a server cluster or a distributed system formed by a plurality of physical servers, or may further be a cloud server that provides basic cloud computing services such as a cloud service, a cloud database, cloud computing, a cloud function, cloud storage, a network service, cloud communication, a middle-ware service, a domain name service, a security service, a content delivery network (CDN), big data, and an artificial intelligence platform. This is not limited herein.

As shown in FIG. 1, the content producer 10 and the server 20 establish a communication connection through a network 30 in advance, whereby the content producer 10 and the server 20 communicate with each other through the network 30. The network 30 may be a wired network, or may be a wireless network, and this is not limited herein.

In addition, in a specific implementation of this application, if object-related data is involved in the multimedia, the application of the foregoing embodiments of this application to specific products or technologies requires permission or consent of the object, and collection, use, and processing of the relevant data need to comply with relevant regulations and standards of relevant countries and regions.

Various implementation details of the technical solutions of the embodiments of this application are described below in detail.

Figure 2:
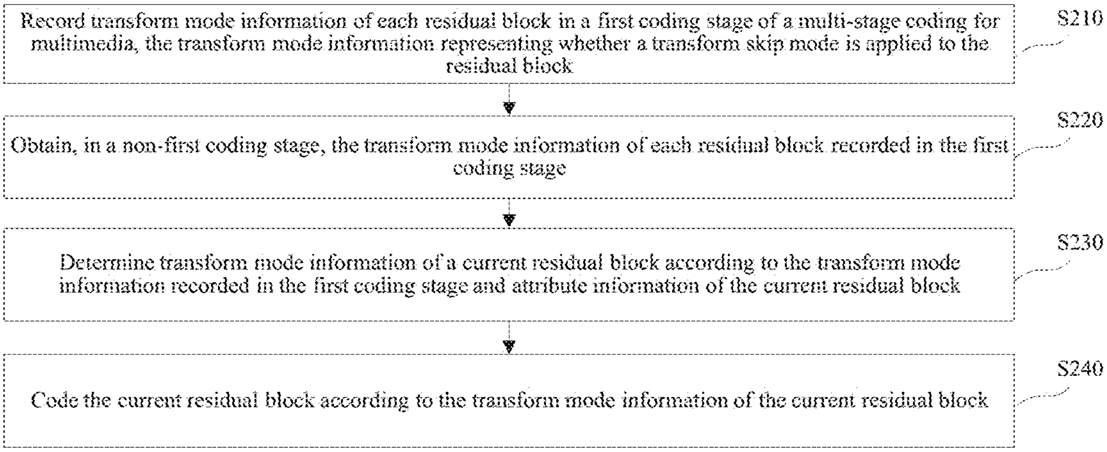
FIG. 2 is a flowchart of a multimedia coding method according to an exemplary embodiment of this application.

FIG. 2 is a flowchart of a multimedia coding method according to an embodiment of this application. The method may be applied to the implementation environment shown in FIG. 1. The method may be executed in an electronic device, for example, may be executed by a content producer or a server, or may be executed jointly by the content producer and the server. In this embodiment of this application, an example in which the method is executed by the server is taken for description. The multimedia coding method may include operation S210 to operation S240. Details are described as follows:

S210: Record transform mode information of each residual block in a first coding stage of a plurality of times of multimedia coding, the transform mode information representing whether a transform skip mode is applied.

In this embodiment of this application, the multimedia is coded for a plurality of times, namely, coded at least twice; For example, coding is performed according to different code rates. The multimedia includes, but is not limited to, any one of an image, an animation, and a video. This is not limited herein. The transform skip mode is a mode in which no transform is performed. In other words, the transform mode information may indicate whether a transform skip mode or a transform execution mode is applied, namely, indicate whether a transform operation is performed. A residual block may represent a difference between a corresponding coding block and a prediction block.

In the first coding stage of the multi-stage coding for multimedia, operations such as prediction, transform, quantization, and entropy coding may be performed, where a quantity of coding information is reduced through the prediction operation, and the residual block is obtained; energy of a residual signal is concentrated in a frequency domain through the transform operation, so as to improve compression efficiency of the subsequent entropy coding; damaged information is deleted through the quantization operation; and quantity is compressed through the entropy coding.

In this embodiment of this application, during the first coding, the server may perform the transform operation on each residual block, and record the transform mode information of each residual block. The transform mode information is configured for indicating whether to apply the transform skip mode, namely, whether to perform a transform operation on the residual block, where the server may obtain the transform mode information from a transform coefficient of each residual block. Specifically, the transform coefficients are numerical values calculated in a transform process, and represent expression modes of the residual blocks in a transform domain. Different transform modes may generate different transform coefficients, and consequently, the transform mode information may be obtained by analyzing the transform coefficient. During the first coding, after the residual block is obtained through the prediction operation, some residual blocks may not be transformed when the transform operation is performed. For example, during JPEG compression, common transform operations include discrete cosine transform (DCT) and discrete wavelet transform (DWT). For the DCT, the server may judge whether the DCT is applied by analyzing a distribution situation of the transform coefficients. For the DWT, because the transform coefficient of the DWT has sparsity, the server may judge whether the DWT is applied by detecting a zero value in the transform coefficient, and further may record which residual blocks are transformed, and which residual blocks skip the transform.

S220: Obtain, in a non-first coding stage, the transform mode information of each residual block recorded in the first coding stage.

In this embodiment of this application, the non-first coding may be any coding after the first coding, and the server may obtain the transform mode information of each residual block recorded in the first coding stage.

Figure 3:
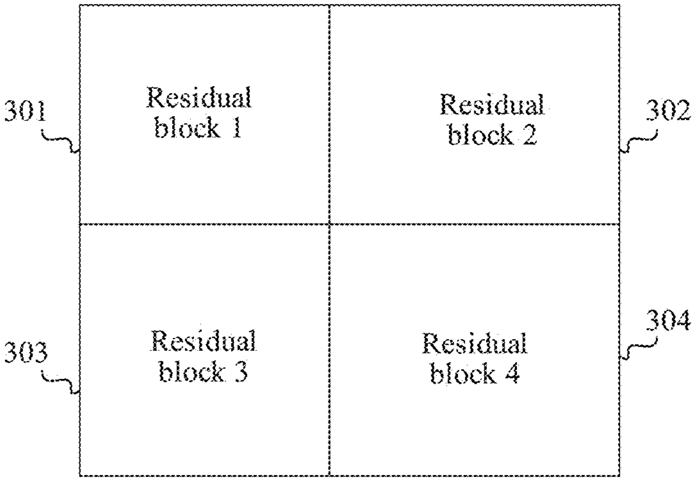
FIG. 3 is a schematic diagram of storing transform mode information of a residual block according to an exemplary embodiment of this application.

In an example, after obtaining the transform mode information of each residual block recorded in the first coding stage, the server may integrate the obtained transform mode information of the residual blocks. For example, the transform mode information of each residual block is sorted and arranged based on a position of each residual block, to obtain the transform mode information of the residual blocks of the multimedia, to facilitate subsequent analysis. As shown in FIG. 3, a residual block 1 to a residual block 4 are obtained through the prediction operation, which are respectively located at an upper left corner, an upper right corner, a lower left corner, and a lower right corner, and the transform mode information of each residual block is correspondingly set in an upper left corner area 301, an upper right corner area 302, a lower left corner area 303, and a lower right corner area 304.

S230: Determine transform mode information of a current residual block according to the transform mode information recorded in the first coding stage and attribute information of the current residual block.

In a non-first coding stage, the current residual block may be obtained through the prediction operation. During the prediction operations of the first coding and the non-first coding, a block division result may be different. Therefore, the current residual block may be different from the residual block during the first coding, and further the attribute information of the current residual block is also different from the attribute information of the residual block during the first coding. The attribute information of the current residual block is information for describing characteristics of the current residual block, and is configured for describing various attributes of an object, such as a size and a position. When the current residual block is obtained through the prediction operation, the server already learns the attribute information of the current residual block.

In this embodiment of this application, the transform mode information recorded in the first coding stage is taken as an important basis for judging whether a transform operation needs to be performed on the current residual block. The server may determine the transform mode information of the current residual block according to the transform mode information recorded in the first coding stage and the attribute information of the current residual block, namely, the server may determine whether a transform operation needs to be performed on the current residual block.

S240: Code the current residual block according to the transform mode information of the current residual block.

In this embodiment of this application, after the transform mode information of the current residual block is determined, if the transform mode information of the current residual block is to apply the transform operation, the transform operation is performed on the current residual block, for example, applying the discrete cosine transform (DCT). In this way, the residual block is transformed from a pixel domain to a frequency domain, and most energy in the residual block is concentrated on few coefficients of the frequency, so that the coefficients can be more effectively compressed and transmitted. If the transform mode information of the current residual block is to skip the transform operation, a quantization operation is performed on the current residual block. In this way, the coefficients in the residual block are approximated and rounded, so that the residual block is more easily compressed.

In one embodiment, if the transform mode information of the current residual block indicates the application of the transform skip mode, the quantization operation than the transform operation is performed on the current residual block. If the transform mode information of the current residual block indicates the application of a transform execution mode, the transform operation is performed on the current residual block before the quantization.

In this embodiment of this application, for the multi-stage coding for multimedia, the transform mode information of the residual block is recorded in the first coding stage of the multi-stage coding for multimedia; in a non-first coding stage, the transform mode information of each residual block recorded in the first coding stage is obtained; the transform mode information of the current residual block is determined according to the transform mode information recorded in the first coding stage and attribute information of the current residual block; the current residual block is coded according to the transform mode information of the current residual block; and in the technical solution provided in this application, with reference to the transform mode information of each residual block during the first coding, the corresponding transform mode information is determined for the current residual block in the non-first coding stage, and it is unnecessary to select an optimal mode from two modes after the two modes are coded simultaneously, which effectively reduces computing complexity in selection of the transform mode information during the multi-stage coding, thereby reducing code stream coding time and overheads of computing resources, and helping improve coding efficiency.

In addition, in other embodiments of this application, in the non-first coding stage, the transform mode information of the current residual block may be determined according to the transform mode information recorded in a preceding coding stage and the attribute information of the current residual block. For example, in the second coding stage, the transform mode information of the current residual block during the second coding is determined according to the transform mode information recorded in the first coding stage and the attribute information of the current residual block during the second coding, and in the second coding stage, the transform mode information of each residual block corresponding to the second coding is recorded; and in the third coding stage, the transform mode information of the current residual block during the third coding is determined according to the transform mode information recorded in the second coding stage and the attribute information of the current residual block during the third coding, and the foregoing operation is repeated in this way.

Figure 4:
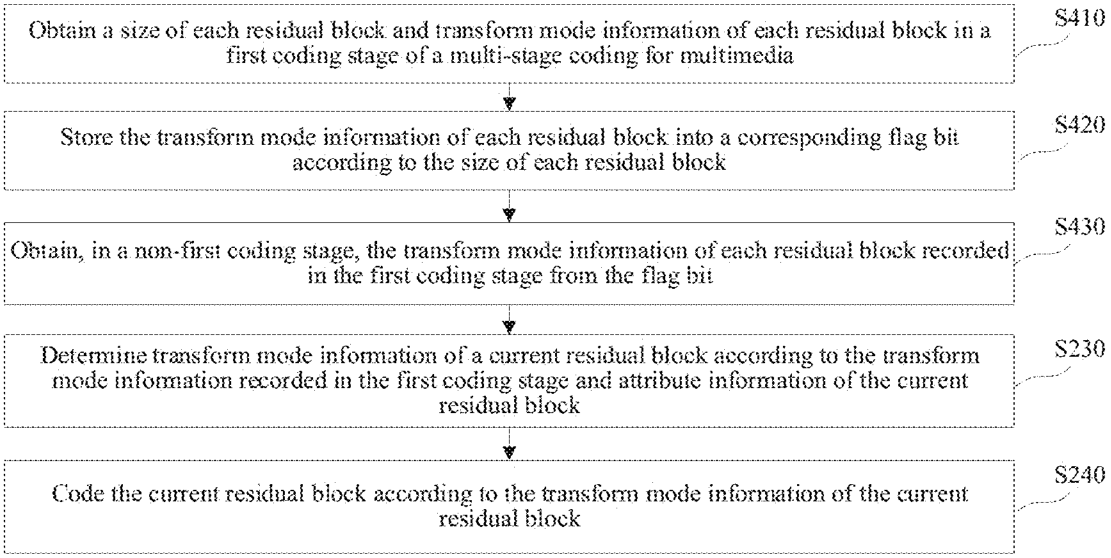
FIG. 4 is a flowchart of another multimedia coding method according to an exemplary embodiment of this application.

In one embodiment of this application, another multimedia coding method is provided. The multimedia coding method may be applied to the implementation environment shown in FIG. 1. The method may be executed by an electronic device, for example, may be executed by a content producer or a server, or may be executed jointly by the content producer and the server. In this embodiment of this application, an example in which the method is executed by a server is taken for description. As shown in FIG. 4, based on the multimedia coding method shown in FIG. 2, operation S210 is expanded to operation S410 to operation S420, and operation S220 is expanded to operation S430. Detailed descriptions of operation S410 to operation S430 are as follows:

S410: Obtain a size of each residual block and the transform mode information of each residual block in the first coding stage of a multi-stage coding for multimedia.

As described above, during the first coding, after a prediction operation is performed on the multimedia, the size of each residual block may be obtained. The size of each residual block may be different, such as a size of 8×8 pixels or a size of 16×16 pixels. After operations such as transform and quantization are performed on the residual block, the transform mode information of each residual block may be obtained.

S420: Store the transform mode information of each residual block into a corresponding flag bit according to the size of each residual block.

In this embodiment of this application, for ease of recording the transform mode information of each residual block, the transform mode information may be stored into the corresponding flag bit. A value of one flag bit may be considered as one flag value, which occupies one bit of storage space. For example, the transform mode information may be stored in a storage resource such as an internal memory. The residual block corresponds to the flag bit. Further, the server may determine the flag bit corresponding to the residual block according to the size of the residual block, and further store the corresponding transform mode information into the flag bit. For example, if the transform operation is performed on the residual block, the flag bit is marked as 1, and if the transform operation is skipped on the residual block, the flag bit is marked as 0.

In addition, different residual blocks correspond to different flag bits. To be specific, the flag bits corresponding to different residual blocks are not overlapped. In an example, the size of the residual block corresponds to a quantity of flag bits corresponding to the residual blocks. One residual block may correspond to a plurality of flag bits, namely, the transform mode information of one residual block may be stored into a plurality of corresponding flag bits.

In an example, the flag bit in which the transform mode information is stored may be stored into the internal memory, or may be stored into a magnetic disk in a form of a read/write file.

S430: Obtain, in the non-first coding stage, the transform mode information of each residual block recorded in the first coding stage from the flag bit.

In this embodiment of this application, during the non-first coding, the server may extract all flag bits from the internal memory, and obtain the transform mode information of each residual block recorded in the first coding stage from the content marked at each flag bit.

In addition, for detailed descriptions of operation S230 to operation S240 shown in FIG. 4, refer to operation S230 to operation S240 shown in FIG. 2. Details are not described herein again.

In this embodiment of this application, in the first coding stage, the transform mode information of each residual block is stored into the corresponding flag bit according to the size of each residual block, so as to facilitate the storage, and further facilitate subsequent obtaining of the flag bit corresponding to each residual block.

Figure 5:
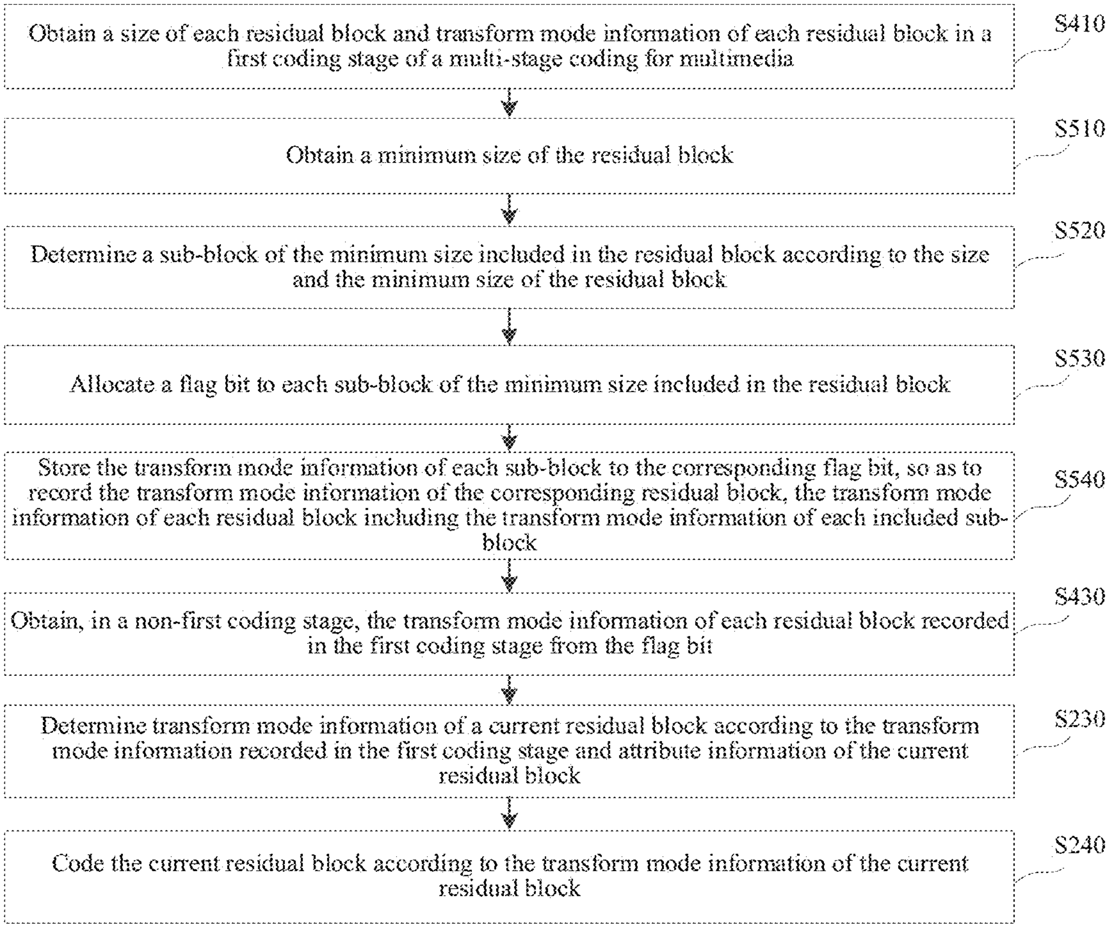
FIG. 5 is a flowchart of another multimedia coding method according to an exemplary embodiment of this application.

An embodiment of this application provides another multimedia coding method. The multimedia coding method may be applied to the implementation environment shown in FIG. 1. The method may be executed by a content producer or a server, or may be executed jointly by the content producer and the server. In this embodiment of this application, an example in which the method is executed by the server is taken for description. As shown in FIG. 5, based on the multimedia coding method shown in FIG. 4, operation S210 or operation S420 is expanded to operation S510 to operation S540. Detailed descriptions of operation S510 to operation S540 are as follows:

S510: Obtain a minimum size of a residual block.

In this embodiment of this application, the minimum size of the residual block may be a size of the smallest residual block, i.e. a preset minimum size of the residual block. For example, the minimum size of the residual block is 2×2 pixels. In other embodiments, the minimum size of the residual block may alternatively be a size that is widely applied to video coding and can provide sufficient information. For example, the minimum size of the residual block is usually 4×4 pixels. In addition, the sub-blocks mentioned in this application are sub-blocks obtained by dividing the residual block according to the minimum size.

S520: Determine a sub-block of the minimum size included in the residual block according to the size and minimum size of the residual block.

In this embodiment of this application, after the size and minimum size of the residual block are learned, the sub-block of the minimum size included in the residual block may be determined. For example, if the size of the residual block is 8×8 pixels, and the minimum size is 2×2 pixels, the residual block includes 16 sub-blocks of 2×2 pixels.

S530: Allocate a flag bit to each sub-block of the minimum size included in the residual block.

S540: Store the transform mode information of each sub-block to the corresponding flag bit, to record the transform mode information of the corresponding residual block, the transform mode information of each residual block including the transform mode information of each included sub-block. Depending on the size of the residual block, one residual block may include one or more sub-blocks of the minimum size, and each sub-block of the minimum size may be associated with one or more flag bits. Each flag bit is configured for representing the transform mode information of one sub-block in the residual block.

In this embodiment of this application, there is a correspondence between the quantity of the sub-blocks of the minimum size covered by the residual block and the quantity of the flag bits corresponding to the residual block, which may be a one-to-one correspondence, namely, one sub-block of the minimum size corresponds to one flag bit. The correspondence may alternatively be one-to-more. For example, one residual block of the minimum size corresponds to two flag bits. A specific correspondence may be flexibly adjusted according to a practical situation, and is not limited herein.

A position of the sub-block of a residual block relative to another sub-block is the same as a position of the flag bit corresponding to the sub-block of the residual block relative to another flag bit; and for example, a residual block A is located at left relative to a residual block B, and a flag bit corresponding to the residual block A is correspondingly located at left relative to a flag bit corresponding to the residual block B.

In this embodiment of this application, after the flag bit corresponding to the residual block is determined, a transform mode of the residual block is stored to the determined flag bit. For example, if the residual block covers 16 2×2 pixels, and one residual block of 2×2 pixels corresponds to one flag bit, the transform mode information of the residual block is stored to 16 flag bits. Assuming that the transform mode information of the residual block is to skip the transform operation, the 16 flag bits at the corresponding positions are marked as skipping the transform operation.

As shown in FIG. 6, black grids indicate sub-blocks of 2×2 pixels, and are included in a residual block 601. Assuming that the residual block 601 selects a transform skip operation and corresponds to the flag bits of 16 sub-blocks, and the residual block 602 selects a transform operation, and corresponds to the flag bits of 9 sub-blocks, the 16 sub-blocks corresponding to the residual block 601 are marked as white, and the 9 sub-blocks corresponding to the residual block 602 are marked as shadow, so as to distinguish different selections of different residual blocks.

In addition, for detailed descriptions of operation S410, operation S430, and operation S230 to operation S240 shown in FIG. 5, refer to S410, S430, and S230 to S240 shown in FIG. 4. Details are not described herein again.

In this embodiment of this application, a quantity of sub-blocks of the minimum size included in the residual block is calculated based on the size of the residual block and the minimum size of the residual block, to further determine the corresponding flag bit, so as to adapt to the residual blocks of various sizes, thereby ensuring that the corresponding flag bits can be determined for the residual blocks of various sizes.

An embodiment of this application further provides another multimedia coding method. The multimedia coding method may be applied to the implementation environment shown in FIG. 1. The method may be executed by a content producer or a server, or may be executed jointly by the content producer and the server. In this embodiment of this application, an example in which the method is executed by the server is taken for description. As shown in FIG. 7, based on the multimedia coding method shown in FIG. 4, operation S230 is expanded to operation S710 to operation S730. Detailed descriptions of operation S710 to operation S730 are as follows:

S710: Obtain a reference flag bit corresponding to each sub-block in the current residual block according to the transform pattern information of each residual block recorded in the first coding stage and the size and the position of the current residual block, each sub-block having the minimum size of the residual block, and the reference flag bit corresponding to each sub-block in the current residual block being a flag bit of the sub-block at a same position in the first coding stage. The sub-block at the same position in the first coding stage is located at the same position as a corresponding sub-block in the current residual block, namely, the corresponding sub-blocks are located in a same image area.

In one embodiment, S710 may include: a coverage area of the current residual block is determined based on the size and the position of the current residual block; and the flag bit of the sub-block located in the coverage area in the first coding stage is determined according to the transform mode information of each residual block recorded in the first coding stage, as the reference flag bit corresponding to the sub-block at the same position in the current residual block. The coverage area is an image area in which the current residual block is located.

S720: Determine distribution of the sub-blocks to which the transform skip mode is applied among various sub-blocks located at the same position as the sub-blocks in the current residual block in the first coding stage according to the reference flag bit corresponding to each sub-block in the current residual block.

In some embodiments, the transform mode information of each residual block recorded in the first coding stage includes the quantity and positions of the flag bits corresponding to the transform mode information of each residual block, namely, including distribution of the transform mode information of the sub-blocks in each residual block. Further, the distribution of various flag bits indicating the application of the transform skip mode, i.e. the distribution of the sub-blocks to which the transform skip mode is applied during the first coding may be obtained according to the quantity and positions of the flag bits corresponding to the transform mode information of each residual block recorded in the first coding stage. Based on the size and the position of the current residual block, the distribution of the flag bits indicating the application of the transform skip mode during the first coding and corresponding to the current residual block may be learned. To be specific, among the sub-blocks in the first coding stage located at the same positions as the sub-blocks of the current residual block, the distribution of the sub-blocks to which the transform skip mode is applied, for example, may include the quantity and positions of the flag bits of the sub-blocks to which the transform skip mode is applied.

S730: Determine the transform mode information of the current residual block according to the obtained distribution of the sub-blocks to which the transform skip mode is applied.

In an example, the transform mode information of the current residual block may be determined through the distribution of the flag bits indicating the application of the transform skip mode during the first coding and corresponding to the current residual block.

In another example, the transform mode information of the current residual block may further be determined through the quantity and positions of the flag bits indicating the application of the transform skip mode during the first coding and corresponding to the current residual block and the position of the current residual block.

In addition, for detailed descriptions of operation S410 to operation S430, and operation S240 shown in FIG. 7, refer to operation S410 to operation S430, and operation S240 shown in FIG. 4. Details are not described herein again.

In this embodiment of this application, the distribution of the flag bits indicating the application of the transform skip mode during the first coding and corresponding to the current residual block is obtained through the transform mode information recorded in the first coding stage and the size and the position of the current residual block, to determine an impact of the distribution of the flag bits indicating the application of the transform skip mode during the first coding on the current residual block, thereby ensuring the accuracy in determining the transform mode information of the current residual block.

Figure 8:
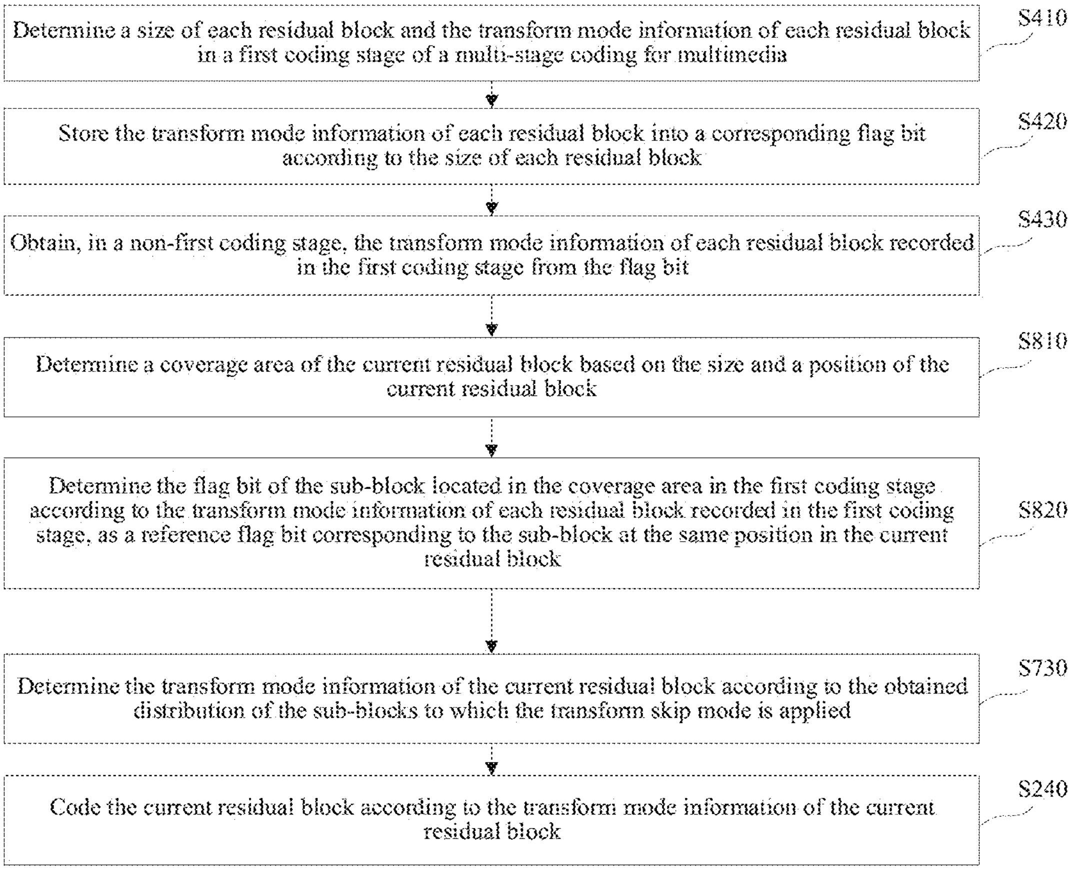
FIG. 8 is a flowchart of another multimedia coding method according to an exemplary embodiment of this application.

In one embodiment of this application, another multimedia coding method is further provided. The multimedia coding method may be applied to the implementation environment shown in FIG. 1. The method may be performed by a content producer or a server, or may be performed jointly by the content producer and the server. In this embodiment of this application, an example in which the method is executed by the server is taken for description. As shown in FIG. 8, based on the multimedia coding method shown in FIG. 7, S710 is expanded to S810 to S830. Descriptions of operation S810 to operation S830 are as follows:

In this embodiment of this application, the transform mode information of each residual block is recorded in the first coding stage. In an example, the transform mode information of each residual block may be marked by using a flag bit distribution diagram, as shown in FIG. 6, and further, the position of each flag bit without the transform operation, i.e. the position distribution of the sub-blocks without the transform operation may be determined from all flag bits by using the transform mode distribution (which may be considered as the flag bit distribution diagram) of the sub-blocks of the residual block. The position of each flag bit without the transform operation is the position of the flag bit in the flag bit distribution diagram, and may be configured for representing the position distribution of the sub-blocks without the transform operation.

S810: Determine a coverage area of the current residual block based on the size and the position of the current residual block.

The position of the flag bit corresponding to the transform mode information of the residual block in the flag bit distribution diagram matches a corresponding position of the residual block in the flag bit distribution diagram, and an area corresponding to the current residual block may be determined through the size of the current residual block. For example, the area of a current residual block of 8×8 pixels in the flag bit distribution diagram is 16 corresponding areas of 2×2 pixels. The corresponding position of the area corresponding to the current residual block in the flag bit distribution diagram may be determined through the position of the current residual block, thereby obtaining the coverage area of the current residual block in the flag bit distribution diagram.

S820: Determine, according to the transform mode information of each residual block recorded in the first coding stage, the flag bit of the sub-block located in the coverage area in the first coding stage, as the reference flag bit corresponding to the sub-block at the same position in the current residual block.

In this embodiment of this application, the flag bit located in the coverage area of the current residual block is selected from the flag bits indicating the application of the transform skip mode, to further obtain the flag bit indicating the application of the transform skip mode during the first coding and covered by the current residual block, namely, the flag bit of the sub-block located in the coverage area in the first coding stage is determined.

In addition, for detailed descriptions of operation S410 to operation S430, operation S720, and operation S240 shown in FIG. 8, refer to operation S410 to operation S430, operation S720, and operation S240 shown in FIG. 7. Details are not described herein again.

In this embodiment of this application, the coverage area of the current residual block is determined according to the size and the position of the current residual block, and further the flag bits indicating the application of the transform skip mode and located in the coverage area are selected, to determine the impact of the distribution of flag bits indicating the application of the transform skip mode during the first coding on the current residual block, thereby ensuring the accuracy in determining the transform mode information of the current residual block.

Figure 9:
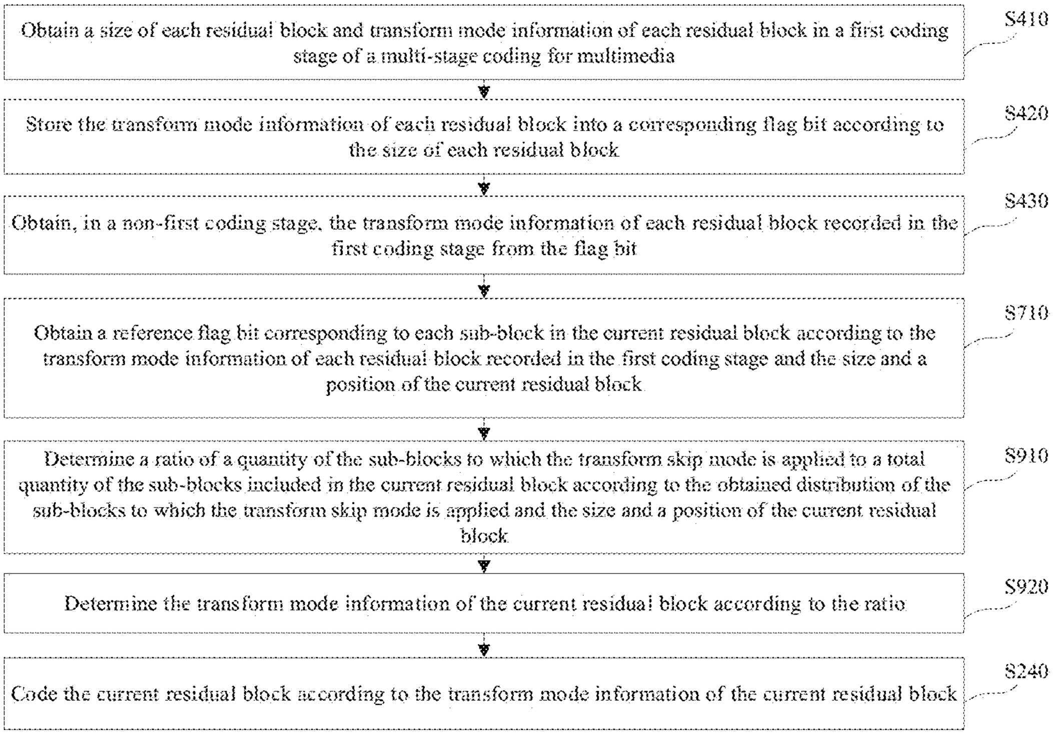
FIG. 9 is a flowchart of a multimedia coding method according to another exemplary embodiment of this application.

An embodiment of this application provides a multimedia coding method. The multimedia coding method may be applied to the implementation environment shown in FIG. 1. The method may be executed by a content producer or a server, or may be executed jointly by the content producer and the server. In this embodiment of this application, an example in which the method is executed by the server is taken for description. As shown in FIG. 9, based on the multimedia coding method shown in FIG. 7, S720 is expanded to S910 to S920. Detailed descriptions of operation S910 to operation S920 are as follows:

S910: Determine a ratio of the quantity of the sub-blocks to which the transform skip mode is applied to a total quantity of the sub-blocks included in the current residual block according to the obtained distribution of the sub-blocks to which the transform skip mode is applied and the size and the position of the current residual block. The total quantity of the sub-blocks included in the current residual block is the same as the quantity of the sub-blocks located in the coverage area of the current residual block during the first coding.

In this embodiment of this application, the area of the sub-blocks of the flag bits indicating the application of the transform skip mode and corresponding to the current residual block (i.e. the area of the sub-blocks indicating the application of the transform skip mode during the first coding) may be learned through the distribution of the flag bits indicating the application of the transform skip mode during the first coding and covered by the current residual block (the obtained distribution of the sub-blocks indicating the application of the transform skip mode during the first coding). The area corresponding to the current residual block may be learned through the size and the position of the current residual block; and further, the ratio of the quantity of the sub-blocks to which the transform skip mode is applied to the total quantity of the sub-blocks included in the current residual block is obtained by comparing the area of the flag bits indicating the application of the transform skip mode with the area corresponding to the current residual block.

S920: Determine the transform mode information of the current residual block according to the ratio.

In this embodiment of this application, the ratio may reflect the impact degree of skipping the transform operation on the current residual block. A larger ratio indicates a larger impact degree of skipping the transform operation on the current residual block, and a larger probability that the transform mode information of the current residual block is to skip the transform operation.

In an example, the corresponding transform mode information may be selected for the current residual block by comparing the ratio with a preset ratio threshold.

In addition, for detailed descriptions of operation S410 to operation S430, operation S710, and operation S240 shown in FIG. 9, refer to operation S410 to operation S430, operation S710, and operation S240 shown in FIG. 7. Details are not described herein again.

In this embodiment of this application, the impact degree of skipping the transform operation on the current residual block is reflected by the ratio, and the transform mode information of the current residual block is further determined, thereby ensuring the accuracy and reliability in determining the transform mode.

Figure 10:
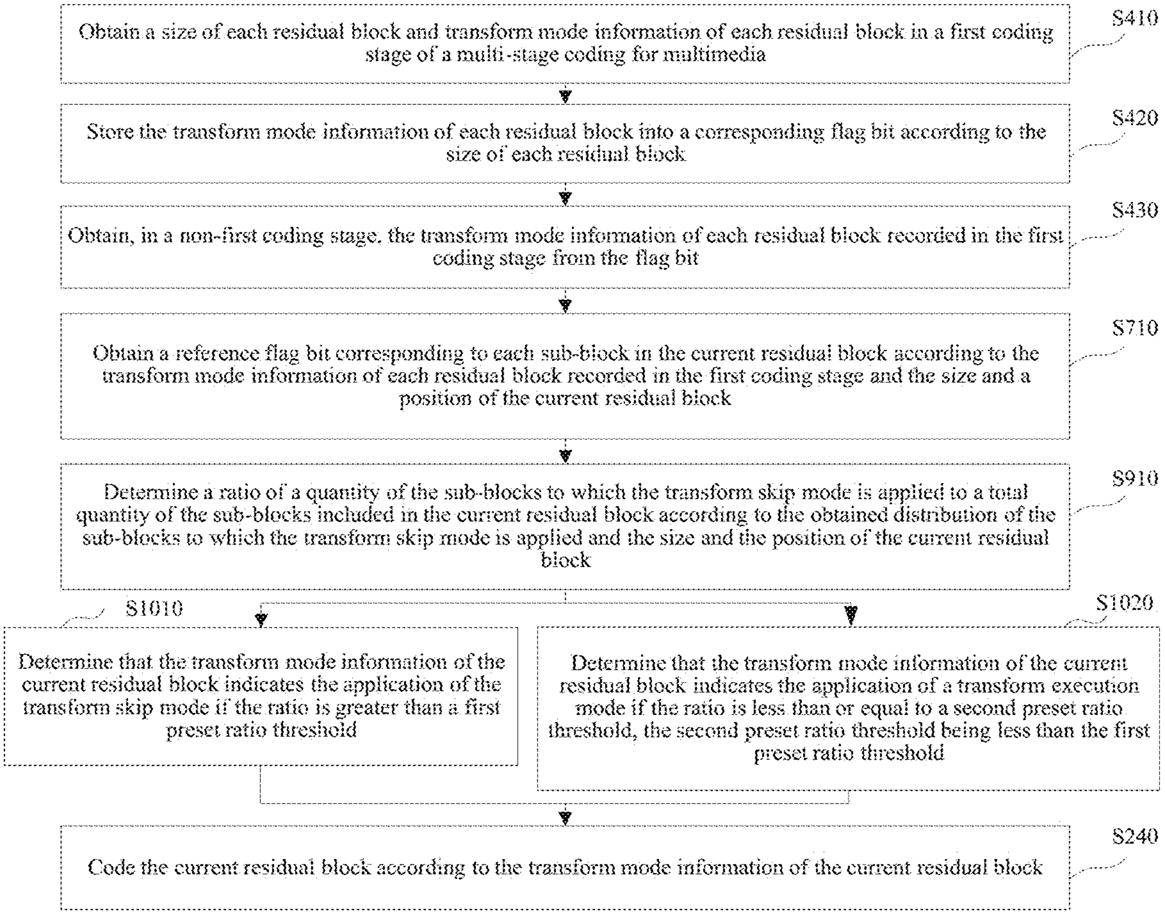
FIG. 10 is a flowchart of another multimedia coding method according to another exemplary embodiment of this application.

An embodiment of this application provides another multimedia coding method. The multimedia coding method may be applied to the implementation environment shown in FIG. 1. The method may be executed by a content producer or a server, or may be executed jointly by the content producer and the server. In this embodiment of this application, an example in which the method is executed by the server is taken for description. As shown in FIG. 10, based on the multimedia coding method shown in FIG. 9, S920 is expanded to S1010 to S1020. Detailed descriptions of operation S1010 to operation S1020 are as follows:

S1010: Determine that the transform mode information of the current residual block indicates the application of the transform skip mode if the ratio is greater than a first preset ratio threshold.

S1020: Determine that the transform mode information of the current residual block indicates the application of a transform execution mode if the ratio is less than or equal to a second preset ratio threshold, the second preset ratio threshold being less than the first preset ratio threshold.

In this embodiment of this application, based on a comparison relationship between the ratio and the preset ratio threshold, the corresponding transform mode information is selected for the current residual block. If the ratio is greater than the first preset ratio threshold, more flag bits indicating the application of the transform skip mode and covered by the current residual block indicate more high-frequency components included in a residual after image content of this area is predicted, and a higher possibility that the transform operation fails to achieve an effect of concentrating residual energy on the to-be-coded residual block. Therefore, it is determined that the transform mode information of the current residual block indicates the transform skip mode.

If the ratio is the second preset ratio threshold, the second preset ratio threshold is less than the first preset ratio threshold, the flag bit indicating the application of the transform skip mode and covered by the current residual block is excessively small, and cannot affect the transform operation. Therefore, it is determined that the transform mode information of the current residual block indicates a transform execution mode.

In an example, the first preset ratio threshold may be flexibly adjusted according to a practical situation. For example, the first preset ratio threshold is 30%. In some scenarios, the first preset ratio threshold may further be adjusted according to an area of the current residual block. For example, a first standard preset ratio threshold is set. The first standard preset ratio threshold corresponds to a standard area of the residual block. The larger area (equivalent to the standard area) of the current residual block indicates a greater first preset ratio threshold.

In an example, the second preset ratio threshold is 0, and in another example, the second preset ratio threshold is 2%, which may be flexibly adjusted according to a practical situation. This is not limited herein.

In addition, for detailed descriptions of operation S410 to operation S430, operation S710, operation S910, and operation S240 shown in FIG. 10, refer to operation S410 to operation S430, operation S710, operation S910, and operation S240 shown in FIG. 9. Details are not described herein again.

In this embodiment of this application, if the ratio is greater than the first preset ratio threshold, there are more flag bits indicating the application of the transform skip mode and covered by the current residual block, and the transform mode information of the current residual block is determined as indicating the transform skip mode. If the ratio is less than or equal to the second preset ratio threshold, it is determined that the transform mode information of the current residual block indicates a transform execution mode, thereby ensuring the properness in determining the transform mode information.

Figure 11:
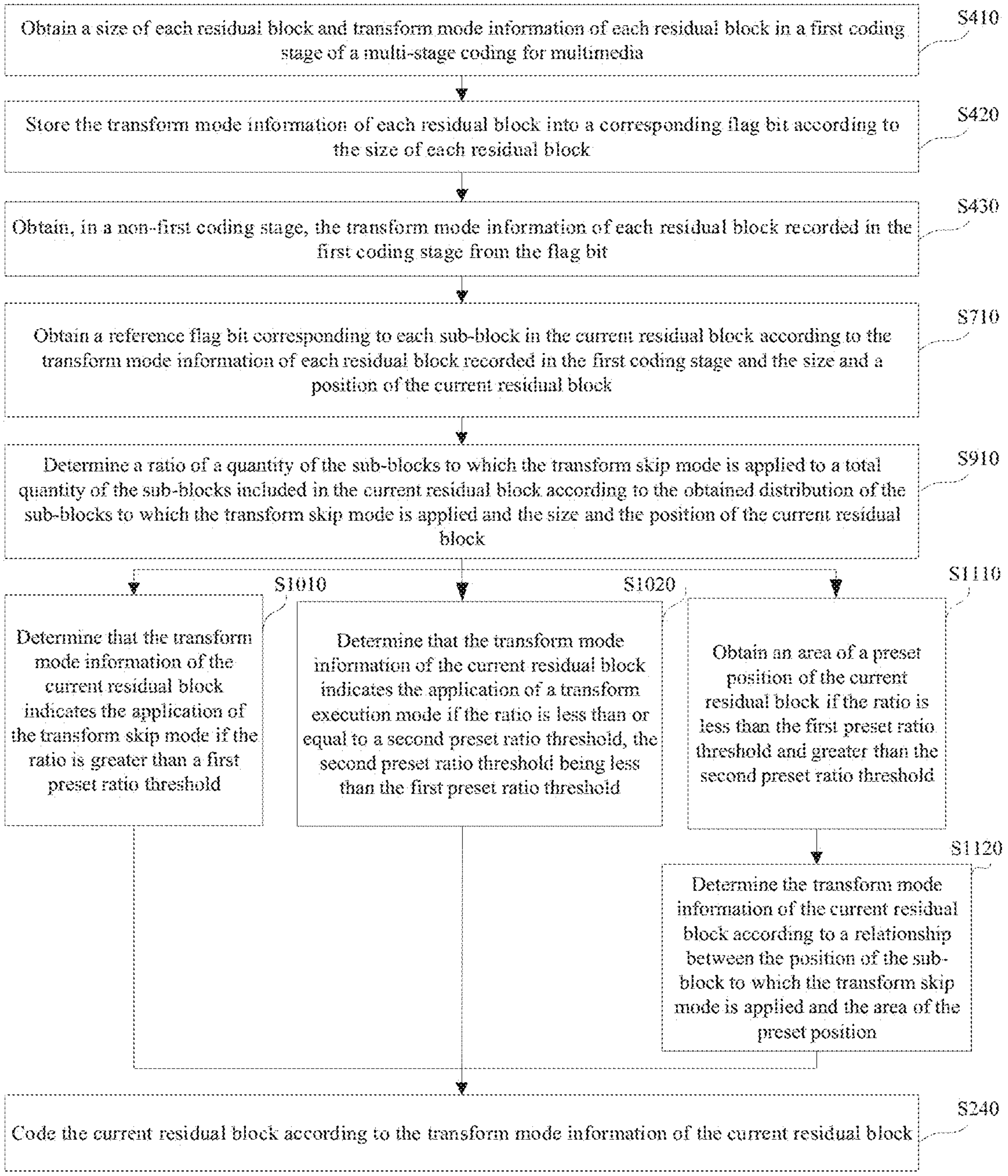
FIG. 11 is a flowchart of another multimedia coding method according to an exemplary embodiment of this application.

An embodiment of this application provides another multimedia coding method. The multimedia coding method may be applied to the implementation environment shown in FIG. 1. The method may be executed by a content producer or a server, or may be executed jointly by the content producer and the server. In this embodiment of this application, an example in which the method is executed by the server is taken for description. As shown in FIG. 11, based on the multimedia coding method shown in FIG. 10, operation S1110 to operation S1120 are added. Detailed descriptions of operation S1110 to operation S1120 are as follows:

S1110: Obtain an area of a preset position of the current residual block if the ratio is less than the first preset ratio threshold and greater than the second preset ratio threshold.

In this embodiment of this application, if the ratio is less than the first preset ratio threshold and greater than the second preset ratio threshold, the quantity of the high-frequency components included by the residual after image content of an image area in which the current residual block is predicted is appropriate. To accurately determine the transform mode information of the current residual block, the transform mode information of the current residual block is further determined based on the position of the flag bit indicating the application of the transform skip mode. In this case, the area of the preset position of the current residual block is obtained.

In an example, the area of the preset position of the current residual block is an area corresponding to the upper left quarter of the to-be-coded residual block, this is because the transform coefficient with a large absolute value is closer to the upper left corner of a transform block, and fewer bits are needed according to a coding rule of a quantization coefficient. A coding order of the coefficients is scanned from the upper left corner to the lower right corner according to a character "Z". The smaller coefficients after quantization are all 0, and it is only necessary to code a flag that is subsequently all 0 after the non-zero coefficients are all coded. Therefore, the transform coefficient having a large absolute value at the upper left corner of the to-be-coded residual block may have better rate-distortion performance without the transform operation.

Figure 12A:
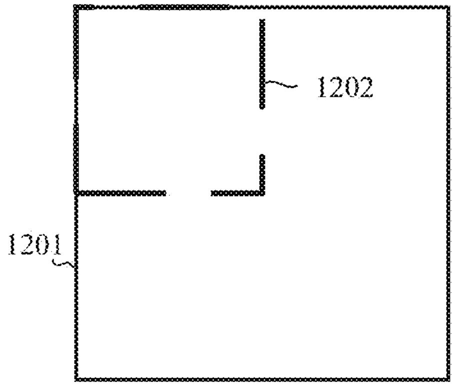
FIG. 12A is a schematic diagram of an area of a preset position of a residual block according to an exemplary embodiment of this application.

In an example, when the area corresponding to the upper left quarter of the to-be-coded residual block is determined, the to-be-coded residual block is evenly divided by four, to determine the area corresponding to the upper left corner. As shown in FIG. 12A, a to-be-coded residual block 1201 is evenly divided into four parts, and the area at the upper left corner serves as an area 1202 of a preset position.

Figure 12B:
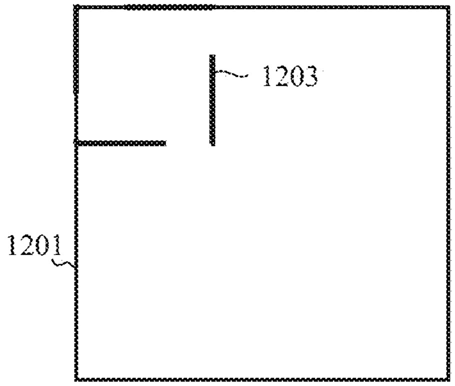
FIG. 12B is a schematic diagram of an area of a preset position of another residual block according to an exemplary embodiment of this application.

In another example, the area of the preset position of the current residual block may be smaller than the area corresponding to the upper left quarter of the to-be-coded residual block. As shown in FIG. 12B, an area 1203 of the preset position of the to-be-coded residual block 1201 is smaller than the area 1202. A specific range of the area of the preset position may be flexibly adjusted according to a practical situation, and is not limited herein.

S1120: Determine the transform mode information of the current residual block according to a relationship between the position of the sub-block to which the transform skip mode is applied and the area of the preset position.

In this embodiment of this application, the relationship between the position of the flag bit indicating the application of the transform skip mode and the area of the preset position refers to whether the position of the flag bit indicating the application of the transform skip mode is in the area of the preset position, to determine whether the to-be-coded residual block has the transform coefficient with a large absolute value, and further determine the corresponding transform mode information for the current residual block.

In addition, for detailed descriptions of operation S410 to operation S430, operation S710, operation S910, operation S1010 to operation S1020, and operation S240 shown in FIG. 11, refer to operation S410 to operation S430, operation S710, operation S910, operation S1010 to operation S1020, and operation S240 shown in FIG. 10. Details are not described herein again.

In this embodiment of this application, if the ratio is less than the first preset ratio threshold and greater than the second preset ratio threshold, the transform mode information of the current residual block is determined according to the relationship between the position of the flag bit indicating the application of the transform skip mode and the area of the preset position, thereby further improving the reliability in determining the transform mode information.

Figure 13:
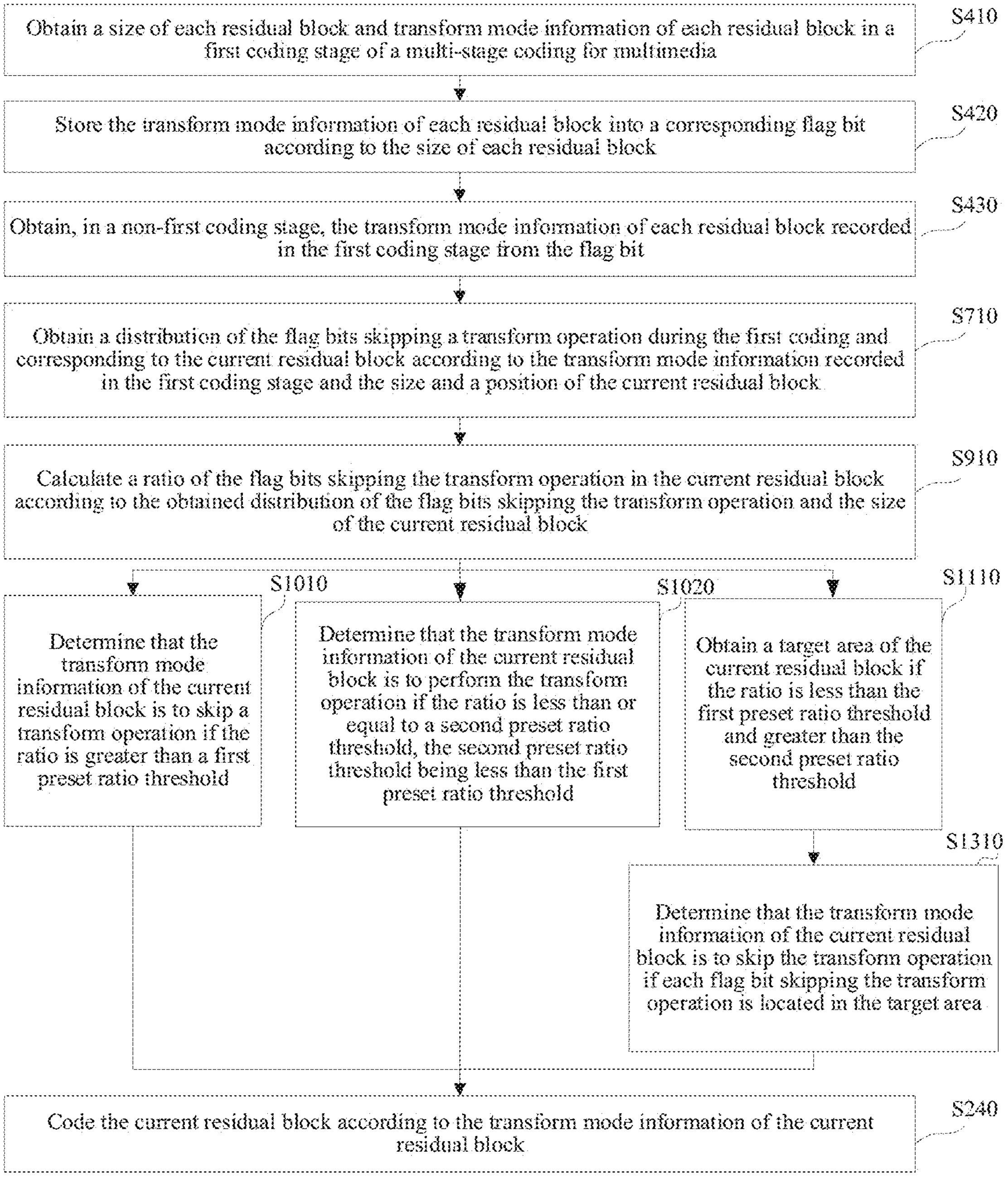
FIG. 13 is a flowchart of another multimedia coding method according to an exemplary embodiment of this application.

An embodiment of this application provides another multimedia coding method. The multimedia coding method may be applied to the implementation environment shown in FIG. 1. The method may be executed by a content producer or a server, or may be executed jointly by the content producer and the server. In this embodiment of this application, an example in which the method is executed by the server is taken for description. As shown in FIG. 13, based on the method shown in FIG. 11, S1120 is expanded to operation S1310, and details are described as follows:

S1310: Determine that the transform mode information of the current residual block indicates the application of the transform skip mode if the position of each sub-block to which the transform skip mode is applied is in the area of the preset position.

In this embodiment of this application, if the position of each flag bit indicating the application of the transform skip mode is in the area of the preset position, the to-be-coded residual block has the characteristic that the coefficients with the large absolute values are concentrated at the upper left corner, and may have better rate-distortion performance without the transform operation. Therefore, it is determined that the transform mode information of the current residual block is to skip the transform operation.

In addition, for detailed descriptions of operation S410 to operation S430, operation S710, operation S910, operation S1010 to operation S1020, operation S1110, and operation S240 shown in FIG. 13, refer to operation S410 to operation S430, operation S710, operation S910, operation S1010 to operation S1020, operation S1110, and operation S240 shown in FIG. 11. Details are not described herein again.

Figure 14:
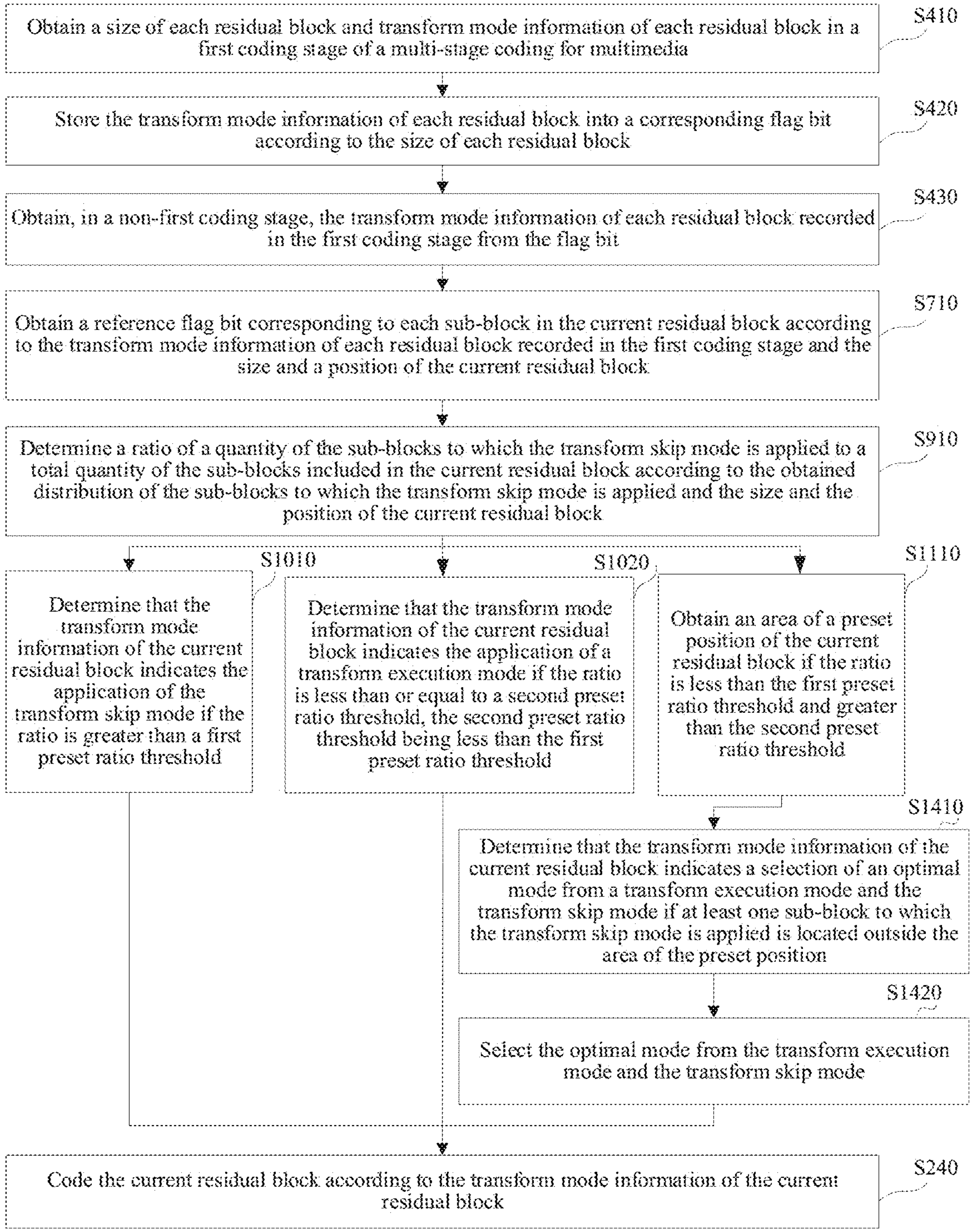
FIG. 14 is a flowchart of a multimedia coding method according to another exemplary embodiment of this application.

An embodiment of this application provides another multimedia coding method. The multimedia coding method may be applied to the implementation environment shown in FIG. 1. The method may be executed by a content producer or a server, or may be executed jointly by the content producer and the server. In this embodiment of this application, an example in which the method is executed by the server is taken for description. As shown in FIG. 14, based on the multimedia coding method shown in FIG. 11, S1120 is expanded to S1410 to S1420.

S1410: Determine that the transform mode information of the current residual block indicates the selection of the optimal mode from a transform execution mode and the transform skip mode if the position of the at least one sub-block to which the transform skip mode is applied is outside the area of the preset position.

S1420: Select the optimal mode from the transform execution mode and the transform skip mode. In an embodiment, in this embodiment of this application, the coding rate-distortion costs of separately applying the transform execution mode and the transform skip mode may be calculated, and then the optimal mode is selected from the transform execution mode and the transform skip mode according to the coding rate-distortion cost of the transform execution mode and the coding rate-distortion cost of the transform skip mode.

In this embodiment of this application, if at least one flag bit indicating the application of the transform skip mode is located outside the area of the preset position, the flag bits indicating the application of the transform skip mode are dispersed. In this case, the server may not perform quick judgment, but selects to perform the transform operation or skip the transform operation for the current residual block, namely, attempts to perform the transform or skip the transform.

To ensure the reliability in selecting the transform mode for the current residual block, an optimal coding operation mode is selected from the application of transform operation and the skipping of transform operation according to the rate-distortion costs. The calculated rate-distortion costs are a quantity of coding bits needed when a given image quality condition is reached. When selecting a most appropriate mode, the encoder compares the calculated rate-distortion costs of the two modes, and selects the mode with lower cost for coding.

In an example, the server may further determine a coder and a decoder to implement compression and decompression, determine a range of a code rate according to a data type that needs to be compressed and a required compression rate, and then calculate a distortion cost at the code rate for each code rate. The distortion cost refers to a difference between the compressed image and the original image. The distortion costs at each code rate in the two modes are compared, and the lowest distortion cost is selected as the most appropriate mode.

In other embodiments of this application, if the flag bit indicating the application of the transform skip mode is located outside the area of the preset position, there is also the flag bit indicating the application of the transform skip mode located in the area of the preset position, and a quantity of the flag bits indicating the application of the transform skip mode and located in the area of the preset position and outside the area of the preset position is equal, namely, the difference between the quantities is not greater than a preset difference threshold, it is determined that the transform mode information of the current residual block is to perform the transform operation and skip the transform operation, so that the optimal coding operation mode is selected from the execution of transform operation and skipping of the transform operation through the rate-distortion cost.

In other embodiments of this application, if all flag bits indicating the application of the transform skip mode are located outside the area of the preset position, it is directly determined that the transform mode information of the current residual block is to perform the transform operation without the selection performed on the two operations.

In addition, for detailed descriptions of operation S410 to operation S430, operation S710, operation S910, operation S1010 to operation S1020, operation S1110, and operation S240 shown in FIG. 14, refer to operation S410 to operation S430, operation S710, operation S910, operation S1010 to operation S1020, operation S1110, and operation S240 shown in FIG. 11. Details are not described herein again.

In this embodiment of this application, for the situation that the flag bit indicating the application of the transform skip mode is located outside the area of the preset position, different transform mode information is selected as the optimal mode, thereby further improving the reliability in determining the transform mode information.

Figure 15:
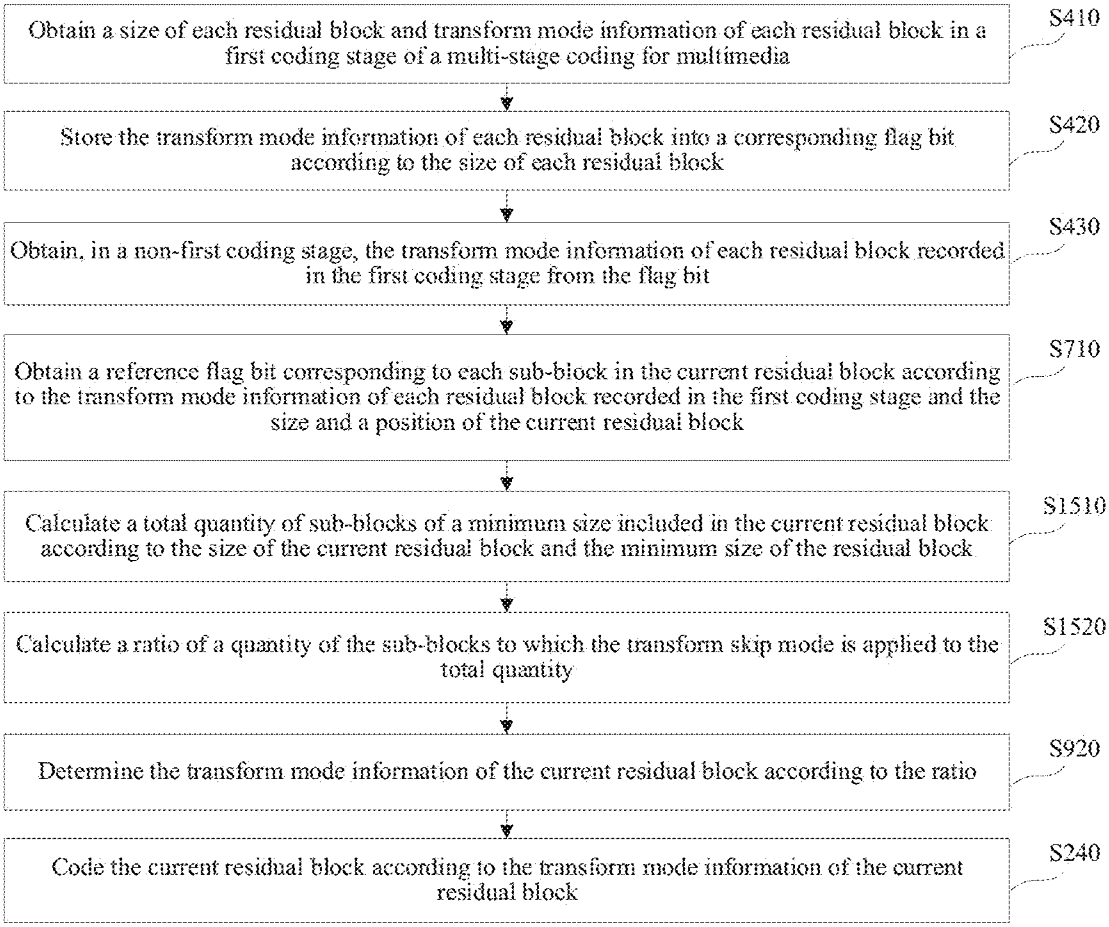
FIG. 15 is a flowchart of another multimedia coding method according to another exemplary embodiment of this application.

FIG. 15 is a flowchart of a multimedia coding method according to an embodiment of this application. The method may be applied to the implementation environment shown in FIG. 1. The method may be executed by a content producer or a server, or may be executed jointly by the content producer and the server. In this embodiment of this application, an example in which the method is executed by the server is taken for description. In the multimedia coding method, S910 shown in FIG. 9 is expanded to S1510 to S1520. Details are described as follows:

S1510: Calculate a total quantity of sub-blocks of a minimum size included in the current residual block according to the size of the current residual block and the minimum size of the residual block.

In this embodiment of this application, to accurately calculate the ratio of the sub-blocks corresponding to the flag bits indicating the application of the transform skip mode in the current residual block, the current residual block is divided into a plurality of sub-blocks of the minimum size according to the size of the current residual block and the minimum size of the residual block, and the total quantity of the sub-blocks of the minimum size included in the current residual block is further calculated.

S1520: Calculate a ratio of the quantity of the sub-blocks to which the transform skip mode is applied to the total quantity.

In this embodiment of this application, a ratio obtained by dividing the quantity of the sub-blocks to which transform skip mode is applied by the total quantity of the sub-blocks of the minimum size included in the current residual block is taken as the ratio of the sub-blocks corresponding to the flag bits indicating the application of the transform skip mode in the current residual block.

In addition, for detailed descriptions of operation S410 to operation S430, operation S710, operation S920, and operation S240 shown in FIG. 15, refer to operation S410 to operation S430, operation S710, operation S920, and operation S240 shown in FIG. 9. Details are not described herein again.

In this embodiment of this application, the quantity of the flag bits corresponding to the current residual block may be obtained according to the size of the current residual block and the minimum size of the residual block. The ratio of the sub-blocks corresponding to the flag bits indicating the application of the transform skip mode in the current residual block is calculated according to the quantity of the flag bits indicating the application of the transform skip mode during the first coding and covered by the current residual block.

For ease of understanding, the following describes the multimedia coding method provided in this embodiment of this application in detail based on the implementation environment shown in FIG. 1. An example in which multimedia is a video is taken.

In the multimedia coding method provided in this embodiment, the video is coded for a plurality of times, to obtain higher code rate accuracy and better coding rate-distortion performance. When the video is coded for the first time, an encoder performs main operations such as prediction, transform, quantization, and entropy coding on the video to obtain a compressed binary code stream.

When the coding is performed for the first time, the transform mode information of each residual block is stored, namely, whether a transform operation is performed on the residual block is stored. Because a block division result of a coded image may be different each time, to use the transform mode information of the residual block during different division, in this embodiment of this application, the transform mode information of each residual block is stored in a block size of 2×2 pixels. This is because the minimum size of the residual block is not less than 2×2 pixels. Although the residual block may have various sizes, the residual block may always be divided into several sub-blocks of 2×2 pixels. For ease of storage, in this embodiment of this application, each residual block of 2×2 pixels corresponds to one flag bit. For example, for a frame of an image in a size of 1920×1080, 860×540 flag bits need to be stored, so that the flag bits may be stored in an internal memory, or may be stored in a magnetic disk system in a form of a read/write file.

Therefore, when the coding is performed for the first time, the information about whether the transform operation is performed on the residual block in each final division form is recorded in the corresponding flag bit. For example, if a residual block of 8×8 pixel selects not to perform the transform operation, and because the residual block covers 16 sub-blocks of 2×2 pixels, the corresponding 16 flag bits are all marked as skipping the transform operation.

Figure 16:
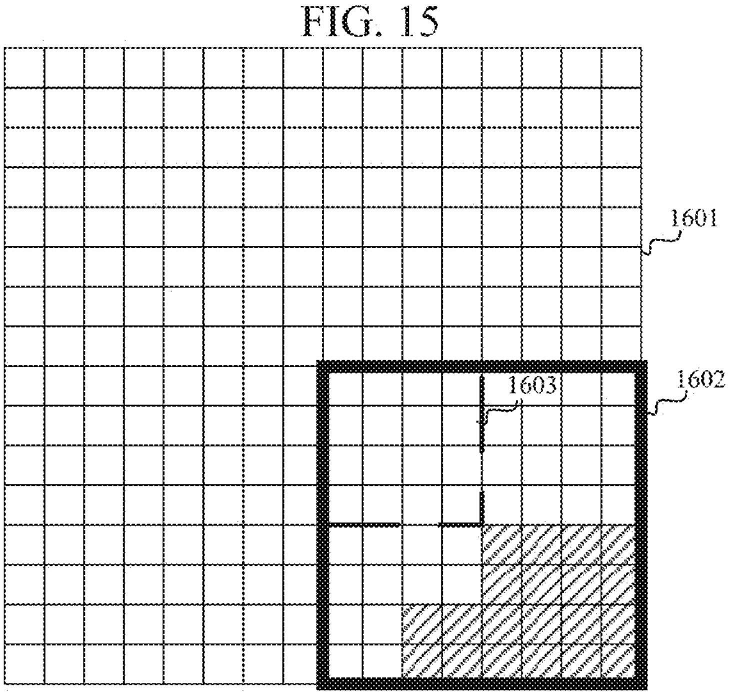
FIG. 16 is a schematic diagram of a flag bit corresponding to a current to-be-coded residual according to another exemplary embodiment of this application.

When the coding is performed subsequently for a plurality of times, for example, when the coding is performed for the second time, the transform mode information stored during the first coding is taken as an important basis for judging whether the transform operation needs to be performed on the current residual block during the second coding. For the current residual block, in this embodiment of this application, the transform mode information stored during the first coding is first obtained, and statistical analysis is performed on a ratio and a position of the blocks of 2×2 pixels skipping the transform. As shown in FIG. 16, a black grid indicates a flag bit storing whether the transform operation is performed on each block of 2×2 pixels. There are 16×16 flag bits stored during the first coding, the blocks of 2×2 pixels on which the transform operation is not performed is marked in shadow, and the blocks of 2×2 pixels on which the transform operation is performed is marked in white.

Whether the transform operation is performed on the to-be-coded residual block is determined according to a ratio of the blocks of 2×2 pixels without transform during the first coding and covered by the to-be-coded residual block and the position distribution of these blocks of 2×2 pixels. As shown in FIG. 16, 1601 is the transform mode information recorded in the first coding stage, an area 1602 is the to-be-coded residual block in a size of 16×16 pixels, and an area 1603 of a preset position of the to-be-coded residual block is circled by a dashed box. The to-be-coded residual block covers 20 blocks of 2×2 pixels (a shaded area in the figure) without transform operation, which accounts for 31.25% of all blocks of 2×2 pixels covered by the to-be-coded residual block, and all the blocks of 2×2 pixels without the transform operation are located outside the area of the preset position.

Generally, a larger quantity of the blocks of 2×2 pixels skipping the transform operation and covered by an area indicates a larger quantity of high-frequency components included in the residual after image content of the area is predicted, and a larger possibility that transform cannot achieve an effect of concentrating the residual energy for the residual block. In addition, according to the coding rule of a quantization coefficient, the transform coefficient with a larger absolute value is closer to the upper left corner of the transform block, and fewer bits are needed. This is because a coding sequence of the coefficients is scanned from the upper left corner to the lower right corner according to a character "Z". The smaller coefficients after quantization are all 0, and it is only necessary to code a flag that is subsequently all 0 after the non-zero coefficients are all coded. When the blocks of 2×2 pixels skipping the transform all fall within the area of the preset position of the to-be-coded residual block. In this case, the to-be-coded residual block may already have the characteristic that the coefficient with the large absolute value is concentrated at the upper left corner of the block, and may have better rate-distortion performance without transform operation. Therefore, the transform mode information of the current residual block may be determined through the following four situations:

a) When a ratio of the blocks of 2×2 pixels skipping the transform in the to-be-coded residual block is greater than k, the to-be-coded residual block skips the transform operation, but is directly quantized.

b) When the to-be-coded residual block does not include the block of 2×2 pixels skipping the transform operation, namely, k is 0, only transform coding is performed on the to-be-coded residual block, and a transform skip mode is not attempted.

c) When the ratio of the blocks of 2×2 pixels skipping the transform in the to-be-coded residual block is between 0 and k, and there are the blocks of 2×2 pixels located in an area of a non-preset position of the to-be-coded residual block, the encoder does not perform quick judgment, attempts both the transform mode and the transform-free mode, and selects an optimal mode according to rate-distortion.

d) When the ratio of the blocks of 2×2 pixels skipping the transform in the to-be-coded residual block is between 0 and k, and all blocks of 2×2 pixels are located in the area of the preset position of the to-be-coded residual block, the to-be-coded residual block is coded without transform, namely, skipping the transform and being directly quantized.

In an example, k is set to 20%, which has a relatively good acceleration loss ratio, or may be set to another value according to a specific requirement.

Figure 17:
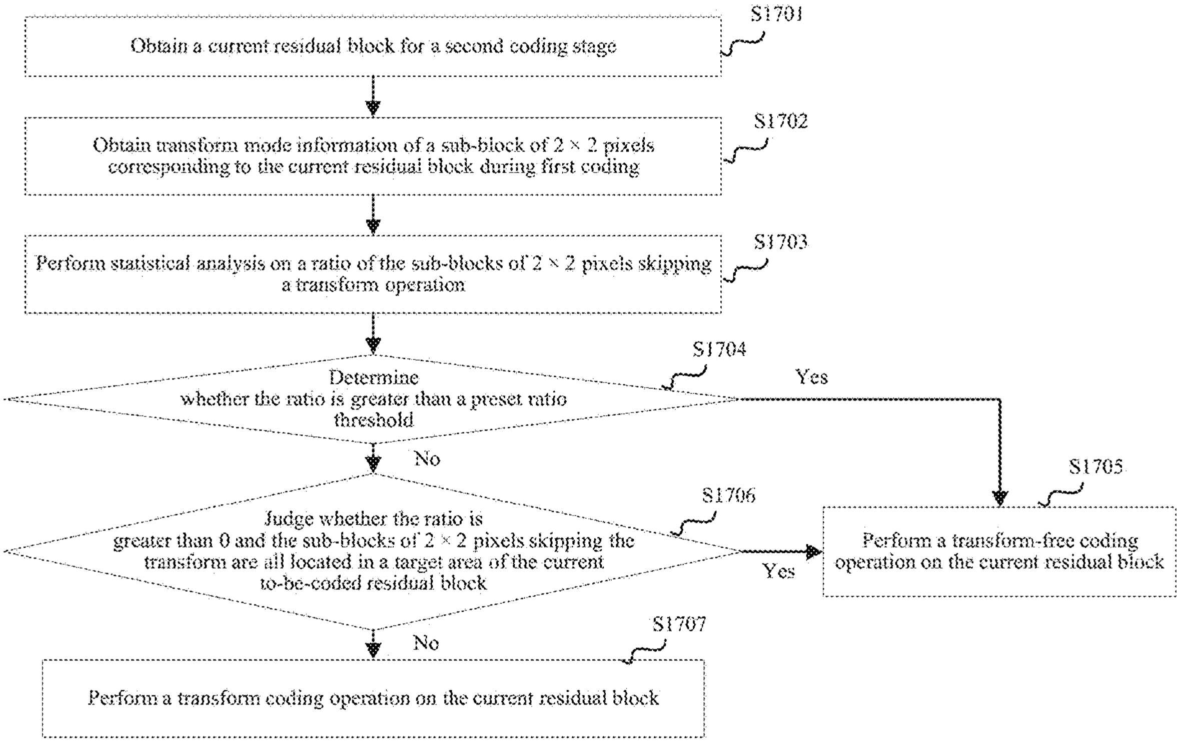
FIG. 17 is a flowchart of a multimedia coding method according to another exemplary embodiment of this application.

Based on the above description, an embodiment of this application further provides a multimedia coding method. As shown in FIG. 17, the method includes:

S1701: Obtain a current residual block for a second coding stage.

S1702: Obtain transform mode information of a sub-block of 2×2 pixels corresponding to the current residual block during the first coding.

S1703: Perform statistical analysis on a ratio of the sub-blocks of 2×2 pixels skipping a transform operation.

S1704: Compare the ratio with a preset ratio threshold, to determine whether the ratio is greater than the preset ratio threshold, and if so, perform S1705, and if not, perform S1706.

S1705: Perform a transform-free coding operation on the current residual block.

S1706: Judge whether the ratio is greater than 0 and the blocks of 2×2 pixels skipping the transform are all located in an area of a preset position of the current residual block; and if so, perform S1705; and if not, perform S1707.

S1707: Perform a transform coding operation on the current residual block.

In this embodiment of this application, when it is determined that the ratio is equal to 0, the transform coding operation is further performed on the current residual block.

In this embodiment of this application, during a multi-stage coding, a selection process of the transform mode information of subsequent coding is accelerated by using the transform mode information during the first coding, which can reduce computing complexity, thereby reducing code stream coding time and overheads of computing resources, and improving coding efficiency.

The following describes apparatus embodiments of this application, which are configured to implement the multimedia coding method in the foregoing embodiment of this application. For details not disclosed in the apparatus embodiments of this application, refer to the foregoing method embodiments of the multimedia coding method in this application.

Figure 18:
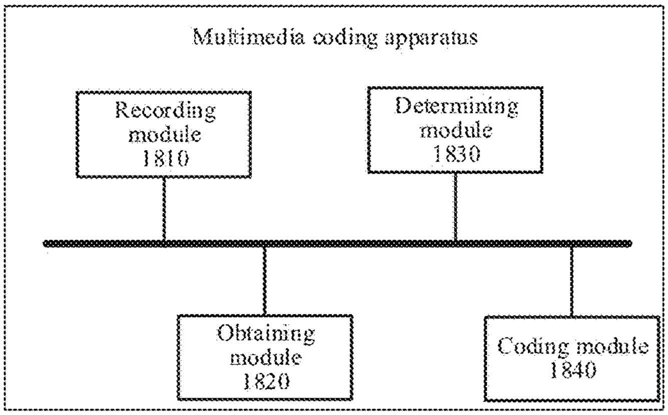
FIG. 18 is a block diagram of a multimedia coding apparatus according to another exemplary embodiment of this application.

An embodiment of this application provides a multimedia coding apparatus. As shown in FIG. 18, the multimedia coding apparatus may be a content producer or a server. The apparatus includes:

a recording module 1810, configured to record transform mode information of a residual block in a first coding stage of a multi-stage coding for multimedia;

an obtaining module 1820, configured to obtain, in a non-first coding stage, the transform mode information of each residual block recorded in the first coding stage;

a determining module 1830, configured to determine transform mode information of a current residual block according to the transform mode information recorded in the first coding stage and attribute information of the current residual block; and a coding module 1840, configured to code the current residual block according to the transform mode information of the current residual block.

In addition, the apparatus provided in the foregoing embodiment and the method provided in the foregoing embodiment are based on the same concept. The specific manners of performing operations by each module and unit of the apparatus have been described in detail in the method embodiment. Details are not repeated herein.

An embodiment of this application further provides an electronic device, including one or more processors, and a storage apparatus, where the storage apparatus is configured to store one or more computer programs, and the one or more computer programs, when executed by the one or more processors, cause the electronic device to implement the multimedia coding method as described above.

Figure 19:
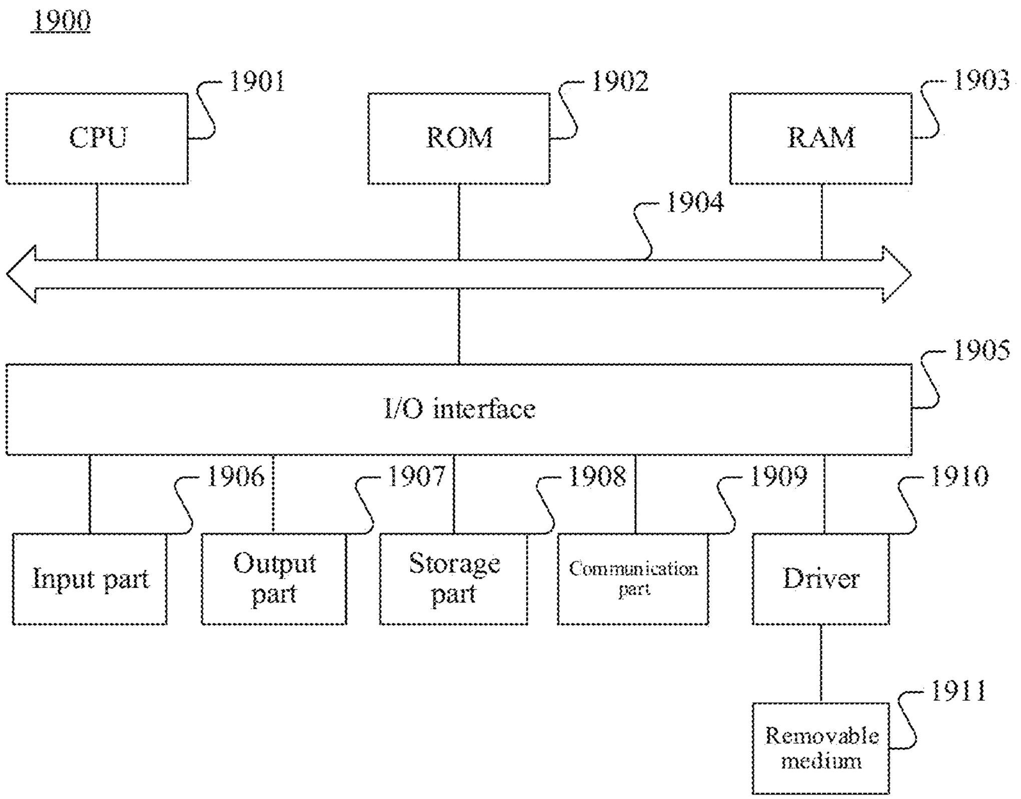
FIG. 19 is a schematic structural diagram of a computer system suitable for implementing an electronic device according to an embodiment of this application.

FIG. 19 is a schematic structural diagram of a computer system suitable for implementing an electronic device according to an embodiment of this application.

In addition, a computer system 1900 of the electronic device shown in FIG. 19 is merely an example, and does not constitute any limitation on functions and a range of application of the embodiments of this application. The electronic device may be a client or a server.

As shown in FIG. 19, the computer system 1900 includes a central processing unit (CPU) 1901, which may perform various suitable actions and processing based on a program stored in a read-only memory (ROM) 1902 or a program loaded from a storage part 1908 into a random access memory (RAM) 1903, for example, perform the method described in the foregoing embodiments. The RAM 1903 further stores various programs and data required for system operations. The CPU 1901, the ROM 1902, and the RAM 1903 are connected to each other through a bus 1904. An input/output (I/O) interface 1905 is further connected to the bus 1904.

In some embodiments, the following components are connected to the input/output (I/O) interface 1905: an input part 1906 including a keyboard, a mouse, and the like; an output part 1907 including a cathode ray tube (CRT), a liquid crystal display (LCD), a speaker, or the like; the storage part 1908 including a hard disk, or the like; and a communication part 1909 including a network interface card such as a local area network (LAN) card and a modem. The communication part 1909 performs communication processing by using a network such as the Internet. A driver 1910 is also connected to the I/O interface 1905 as required. A removable medium 1911, such as a magnetic disk, an optical disk, a magneto-optical disk, or a semiconductor memory, is installed on the driver 1910 as required, so that a computer program read from the removable medium is installed into the storage part 1908 as required.

Particularly, according to an embodiment of this application, the processes described above by referring to the flowcharts may be implemented as computer programs. For example, an embodiment of this application includes a computer program product. The computer program product includes a computer program stored in a computer-readable medium. The computer program includes a computer program for implementing a method shown in the flowchart. In this embodiment, the computer program may be downloaded and installed from a network through the communication part 1909, and/or installed from the removable medium 1911. When the computer program is executed by the central processing unit (CPU) 1901, various functions defined in the system of this application are performed.

In addition, the computer-readable medium described in the embodiments of this application may be a computer-readable signal medium or a computer-readable storage medium or any combination of the above. The computer-readable storage medium may be, for example, an electrical, magnetic, optical, electromagnetic, infrared, or semiconductor system, apparatus, or device, or any combination thereof. A more specific example of the computer-readable storage medium may include but is not limited to: an electrical connection having one or more wires, a portable computer disk, a hard disk, a RAM, a ROM, an erasable programmable ROM (EPROM), a flash memory, an optical fiber, a portable compact disk ROM (CD-ROM), an optical storage device, a magnetic storage device, or any appropriate combination of the above. In this application, the computer-readable signal medium may include a data signal transmitted in a base band or as part of a carrier, and stores a computer-readable computer program. A data signal propagated in such a way may assume a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in conjunction with an instruction execution system, an apparatus, or a device. The computer program included in the computer-readable medium may be transmitted by using any suitable medium, including but not limited to: a wireless medium, a wired medium, or any suitable combination of the above.

The flowcharts and block diagrams in the accompanying drawings illustrate possible system architectures, functions and operations that may be implemented by an apparatus, a method, and a computer program product according to various embodiments of this application. Each box in a flowchart or a block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. It is to be noted that, each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer program.

A related unit described in the embodiments of this application may be implemented in a software manner, or may be implemented in a hardware manner, and the unit or module described can also be set in a processor. Names of the units or modules do not constitute a limitation on the units or modules in a specific case.

Another aspect of this application further provides a non-transitory computer-readable storage medium, having a computer program stored therein, and the computer program, when executed by a processor, implementing the method as described above. The computer-readable storage medium may be included in the electronic device described in the foregoing embodiments, or may exist alone and is not disposed in the electronic device.

Another aspect of this application further provides a computer program product, the computer program product including a computer program, and the computer program being stored in a computer-readable storage medium. A processor of an electronic device reads the computer program from the computer-readable storage medium and executes the computer program to cause the electronic device to implement the method provided in the foregoing embodiments.

Although a plurality of modules or units of a device configured to perform actions are discussed in the foregoing detailed description, such division is not mandatory. Actually, according to the implementations of this application, the features and functions of two or more modules or units described above may be specifically implemented in one module or unit. On the contrary, the features and functions of one module or unit described above may be further divided to be embodied by a plurality of modules or units.

After considering the specification and practicing the implementations of the present disclosure, a person skilled in the art may easily conceive of other implementations of this application. This application is intended to cover any variations, uses, or adaptive changes of this application. These variations, uses, or adaptive changes follow the general principles of this application and include common general knowledge or common technical means in the art, which are not disclosed in this application.

What is described above is merely exemplary embodiments of this application, and is not intended to limit the embodiments of this application. A person of ordinary skill in the art can easily make equivalent changes or modifications according to the main concept and spirit of this application. Therefore, the protection scope of this application is subject to the protection scope specified in the claims.

In the embodiments of this application, the term "module" or "unit" refers to a computer program having a preset function or a part of a computer program, and works together with other relevant parts to achieve a preset objective, and may be all or partially implemented by using software, hardware (such as a processing circuit or a memory), or a combination thereof. Similarly, one processor (or a plurality of processors or memories) may be configured to implement one or more modules or units. In addition, each module or unit may be a part of an overall module or unit including a function of the module or unit.

What is claimed is:

1. A multimedia coding method, the method comprising:
recording transform mode information of one or more residual blocks in a first coding stage of a multi-stage coding for multimedia, the transform mode information representing whether a transform skip mode is applied to the one or more residual blocks;
obtaining, in a non-first coding stage, the transform mode information of the one or more residual blocks recorded in the first coding stage;
determining transform mode information of a current residual block according to the transform mode information recorded in the first coding stage; and
coding the current residual block according to the transform mode information of the current residual block.

2. The method according to claim 1, wherein the recording transform mode information of each residual block comprises:
obtaining a size of the residual block and the transform mode information of the residual block in the first coding stage;
storing the transform mode information of the residual block into a corresponding flag bit according to the size of the residual block; and
the obtaining, in a non-first coding stage, the transform mode information of each residual block recorded in the first coding stage comprises:
obtaining, in the non-first coding stage, the transform mode information of each residual block recorded in the first coding stage from a corresponding flag bit.

3. The method according to claim 1, wherein the recording transform mode information of each residual block comprises:
obtaining a minimum size of the residual block; and
determining a plurality of sub-blocks comprised in the residual block according to the size and the minimum size of the residual block;
allocating a flag bit to each sub-block comprised in the residual block; and
storing transform mode information of each sub-block to the corresponding flag bit, so as to record the transform mode information of the residual block.

4. The method according to claim 1, wherein the determining transform mode information of a current residual block according to the transform mode information recorded in the first coding stage further comprises:
obtaining a reference flag bit corresponding to each sub-block in the current residual block according to the transform mode information of each residual block recorded in the first coding stage and a size and a position of the current residual block, and the reference flag bit being a flag bit of the sub-block at a same position in the first coding stage;
determining distribution of sub-blocks to which the transform skip mode is applied among various sub-blocks at the same position as the sub-blocks in the current residual block in the first coding stage according to the reference flag bit; and
determining the transform mode information of the current residual block according to the obtained distribution of the sub-blocks to which the transform skip mode is applied.

5. The method according to claim 4, wherein the obtaining a reference flag bit corresponding to each sub-block in the current residual block according to the transform mode information of each residual block recorded in the first coding stage and the size and the position of the current residual block, and the reference flag bit being a flag bit of the sub-block at a same position in the first coding stage comprises:
determining a coverage area of the current residual block according to the size and the position of the current residual block; and
determining a flag bit of a sub-block located in the coverage area in the first coding stage according to the transform mode information of each residual block recorded in the first coding stage, as the reference flag bit corresponding to the sub-block at the same position in the current residual block.

6. The method according to claim 4, wherein the determining the transform mode information of the current residual block according to the obtained distribution of the sub-blocks to which the transform skip mode is applied comprises:
determining the transform mode information of the current residual block according to a ratio of the sub-blocks to which the transform skip mode is applied to the sub-blocks comprised in the current residual block.

7. The method according to claim 1, wherein the coding the current residual block according to the transform mode information of the current residual block comprises:
performing a quantization operation on the current residual block directly when the transform mode information of the current residual block indicates a transform skip mode; and
performing a transform operation on the current residual block before quantization when the transform mode information of the current residual block indicates a transform execution mode.

8. An electronic device, comprising:
one or more processors; and
a storage apparatus, configured to store one or more programs, the one or more programs, when executed by the one or more processors, causing the electronic device to implement a multimedia coding method including:
recording transform mode information of one or more residual blocks in a first coding stage of a multi-stage coding for multimedia, the transform mode information representing whether a transform skip mode is applied to the one or more residual blocks;
obtaining, in a non-first coding stage, the transform mode information of the one or more residual blocks recorded in the first coding stage;
determining transform mode information of a current residual block according to the transform mode information recorded in the first coding stage; and
coding the current residual block according to the transform mode information of the current residual block.

9. The electronic device according to claim 8, wherein the recording transform mode information of each residual block comprises:
obtaining a size of the residual block and the transform mode information of the residual block in the first coding stage;
storing the transform mode information of the residual block into a corresponding flag bit according to the size of the residual block; and
the obtaining, in a non-first coding stage, the transform mode information of each residual block recorded in the first coding stage comprises:

obtaining, in the non-first coding stage, the transform mode information of each residual block recorded in the first coding stage from a corresponding flag bit.

10. The electronic device according to claim 8, wherein the recording transform mode information of each residual block comprises:

obtaining a minimum size of the residual block; and determining a plurality of sub-blocks comprised in the residual block according to the size and the minimum size of the residual block;

allocating a flag bit to each sub-block comprised in the residual block; and storing transform mode information of each sub-block to the corresponding flag bit, so as to record the transform mode information of the residual block.

11. The electronic device according to claim 8, wherein the determining transform mode information of a current residual block according to the transform mode information recorded in the first coding stage further comprises:

obtaining a reference flag bit corresponding to each sub-block in the current residual block according to the transform mode information of each residual block recorded in the first coding stage and a size and a position of the current residual block, and the reference flag bit being a flag bit of the sub-block at a same position in the first coding stage;

determining distribution of sub-blocks to which the transform skip mode is applied among various sub-blocks at the same position as the sub-blocks in the current residual block in the first coding stage according to the reference flag bit; and determining the transform mode information of the current residual block according to the obtained distribution of the sub-blocks to which the transform skip mode is applied.

12. The electronic device according to claim 11, wherein the obtaining a reference flag bit corresponding to each sub-block in the current residual block according to the transform mode information of each residual block recorded in the first coding stage and the size and the position of the current residual block, and the reference flag bit being a flag bit of the sub-block at a same position in the first coding stage comprises:

determining a coverage area of the current residual block according to the size and the position of the current residual block; and determining a flag bit of a sub-block located in the coverage area in the first coding stage according to the transform mode information of each residual block recorded in the first coding stage, as the reference flag bit corresponding to the sub-block at the same position in the current residual block.

13. The electronic device according to claim 11, wherein the determining the transform mode information of the current residual block according to the obtained distribution of the sub-blocks to which the transform skip mode is applied comprises:

determining the transform mode information of the current residual block according to a ratio of the sub-blocks to which the transform skip mode is applied to the sub-blocks comprised in the current residual block.

14. The electronic device according to claim 8, wherein the coding the current residual block according to the transform mode information of the current residual block comprises:

performing a quantization operation on the current residual block directly when the transform mode information of the current residual block indicates a transform skip mode; and performing a transform operation on the current residual block before quantization when the transform mode information of the current residual block indicates a transform execution mode.

15. A non-transitory computer-readable storage medium, having a computer program stored therein, the computer program, when executed by a processor of an electronic device, causing the electronic device to implement a multimedia coding method including:

recording transform mode information of one or more residual blocks in a first coding stage of a multi-stage coding for multimedia, the transform mode information representing whether a transform skip mode is applied to the one or more residual blocks;

obtaining, in a non-first coding stage, the transform mode information of the one or more residual blocks recorded in the first coding stage;

determining transform mode information of a current residual block according to the transform mode information recorded in the first coding stage; and coding the current residual block according to the transform mode information of the current residual block.

16. The non-transitory computer-readable storage medium according to claim 15, wherein the recording transform mode information of each residual block comprises:

obtaining a size of the residual block and the transform mode information of the residual block in the first coding stage;

storing the transform mode information of the residual block into a corresponding flag bit according to the size of the residual block; and the obtaining, in a non-first coding stage, the transform mode information of each residual block recorded in the first coding stage comprises:

obtaining, in the non-first coding stage, the transform mode information of each residual block recorded in the first coding stage from a corresponding flag bit.

17. The non-transitory computer-readable storage medium according to claim 15, wherein the recording transform mode information of each residual block comprises:

obtaining a minimum size of the residual block; and determining a plurality of sub-blocks comprised in the residual block according to the size and the minimum size of the residual block;

allocating a flag bit to each sub-block comprised in the residual block; and storing transform mode information of each sub-block to the corresponding flag bit, so as to record the transform mode information of the residual block.

18. The non-transitory computer-readable storage medium according to claim 15, wherein the determining transform mode information of a current residual block according to the transform mode information recorded in the first coding stage comprises:

obtaining a reference flag bit corresponding to each sub-block in the current residual block according to the transform mode information of each residual block recorded in the first coding stage and a size and a position of the current residual block, and the reference flag bit being a flag bit of the sub-block at a same position in the first coding stage;

determining distribution of sub-blocks to which the transform skip mode is applied among various sub-blocks at the same position as the sub-blocks in the current residual block in the first coding stage according to the reference flag bit; and determining the transform mode information of the current residual block according to the obtained distribution of the sub-blocks to which the transform skip mode is applied.

19. The non-transitory computer-readable storage medium according to claim 18, wherein the determining the transform mode information of the current residual block according to the obtained distribution of the sub-blocks to which the transform skip mode is applied comprises:

determining the transform mode information of the current residual block according to a ratio of the sub-blocks to which the transform skip mode is applied to the sub-blocks comprised in the current residual block.

20. The non-transitory computer-readable storage medium according to claim 15, wherein the coding the current residual block according to the transform mode information of the current residual block comprises:

performing a quantization operation on the current residual block directly when the transform mode information of the current residual block indicates a transform skip mode; and performing a transform operation on the current residual block before quantization when the transform mode information of the current residual block indicates a transform execution mode.

* * * * *